US008064349B2

(12) United States Patent  
Huh et al.

(10) Patent No.: US 8,064,349 B2
(45) Date of Patent: Nov. 22, 2011

(54) WIRELESS LOCAL ACCESS NETWORK SYSTEM MANAGEMENT PROCEDURE AND STATION SUPPORTING THE PROCEDURE

(75) Inventors: Ji Young Huh, Seoul (KR); Jae Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 757 days.

(21) Appl. No.: 12/168,827

(22) Filed: Jul. 7, 2008

(65) Prior Publication Data

US 2009/0010235 A1   Jan. 8, 2009

(30) Foreign Application Priority Data

Jul. 6, 2007 (KR) .................. 10-2007-0068297
Sep. 15, 2007 (KR) .................. 10-2007-0093929
Oct. 31, 2007 (KR) .................. 10-2007-0109999

(51) Int. Cl.
*H04L 1/00* (2006.01)

(52) U.S. Cl. ..................... 370/241; 455/438

(58) Field of Classification Search .......... 370/241, 370/310, 311, 338; 455/438, 6.71
See application file for complete search history.

(56) References Cited

U.S. PATENT DOCUMENTS

2006/0246904 A1* 11/2006 Olvera-Hernandez et al. ................. 455/438
2006/0264179 A1* 11/2006 Bonneville et al. ........ 455/67.11
2007/0115865 A1* 5/2007 Jokela et al. ............... 370/310
2008/0123577 A1* 5/2008 Jaakkola et al. ............ 370/311

* cited by examiner

*Primary Examiner* — Albert T Chou
(74) *Attorney, Agent, or Firm* — Lee, Hong, Degerman, Kang & Waimey

(57) ABSTRACT

Provided are WLAN system management procedure and a station supporting the procedure. In the management procedure, a station receives one or more event request frames each of which includes zero or more event request elements, wherein each of the event request elements comprises an event type field for specifying the event type of an event request. After reception, if the station moves to a different Extended Service Set (ESS), the station cancels all outstanding event requests of the event request frames and deletes all pending event report frames and event data.

8 Claims, 21 Drawing Sheets

FIG. 5

| Octets | 1 | 1 | 1 | variable |
|---|---|---|---|---|
| | Category | Action | Dialog Token | Event Request Elements |

FIG. 6

| Element ID | Length | Event Token | Event Type | Event Response Limit | Event Request |
|---|---|---|---|---|---|

Octets     1        1        1        1        1        variable

FIG. 7

| Octets | 1 | 1 | 1 | variable |
|---|---|---|---|---|
| | Category | Action | Dialog Token | Event Report Elements |

FIG. 8

| Element ID | Length | Event Token | Event Type | Status | Event Timestamp | Event Report |
|---|---|---|---|---|---|---|
| 1 | 1 | 1 | 1 | 1 | 8 | variable |

Octets

FIG. 20

| Result Code | Description |
|---|---|
| 0 | Successful |
| 1 | Fail |
| 2 | Refused |
| 3 | Incapable |
| 4 | Timeout wating for response from STA |
| 5 | Cancelled |
| 255 | Unspecified |
| 6-254 | Reserved |

FIG. 21

| Result Code | Description |
|---|---|
| 0 | Successful |
| 1 | Fail, due to locally aborting |
| 2 | Fail, due to corrupt request |
| 3 | Refused, due to insufficient resource |
| 4 | Refused, due to excessive number of requests |
| 5 | Incapable, due to insufficient resource |
| 6 | Incapable, due to not supporting this type of request |
| 7 | Cancelled, due to abortion of system |
| 8 | Cancelled, due to timeout waiting for response from STA |
| 9-255 | Reserved |

WIRELESS LOCAL ACCESS NETWORK SYSTEM MANAGEMENT PROCEDURE AND STATION SUPPORTING THE PROCEDURE

CROSS-REFERENCE TO RELATED PATENT APPLICATIONS

This application claims the benefits of Korean Patent Applications Nos. 10-2007-0068297 filed on Jul. 6, 2007, 10-2007-0093929 filed on Sep. 15, 2007, and 10-2007-0109999 filed on Oct. 31, 2007 in the Korean Intellectual Property Office, the disclosures of which are incorporated herein in their entirety by reference.

BACKGROUND OF THE INVENTION

1. Field of the Invention

The present invention relates to a wireless local access network (WLAN), and more particularly, to a WLAN system management procedure and a station supporting the procedure.

2. Description of the Related Art

With the development in information communication technology, a variety of wireless communication technology has been developed. A WLAN permits wireless access to Internet in specific service areas such as home or companies or air planes by the use of portable terminals such as a personal digital assistant (PDA), a laptop computer, and a portable multimedia player (PMP) on the basis of the radio frequency technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz in accordance with the IEEE 802.11. In recent years, with the development of the wireless communication technology, 54 Mbps in maximum can be supported by applying the orthogonal frequency division multiplex (OFDM) technology, etc. to the WLAN. In addition, the IEEE 802.11 has developed or is developing wireless communication technology for improvement in the quality of service (QoS), compatibility of an access point (AP) protocol, security enhancement, radio measurement or radio resource measurement, wireless access in vehicular environment, fast roaming, mesh network, inter-working with external networks, wireless network management, and the like.

The wireless network management procedure for a WLAN provides protocols relevant to the wireless network management, such as allowing a non-AP station or an access point (AP) to collect a variety of information on the wireless network or diagnosing problems of the wireless network. For example, the wireless network management procedure includes an event reporting procedure, a diagnostic reporting procedure, a presence service procedure, a base service set (BSS) transition management procedure, a flexible broadcast multicast service (FBMS) procedure, a traffic filter service (TFS) procedure, and a sleep mode procedure.

The event reporting procedure serves to diagnose states of a network in real time. The even reporting procedure in a WLAN defines a variety of events such as a transition event, a robust security network association (RSNA) event, a peer-to-peer link event, and a system log event as event request/report elements. Event request/report elements other than the system log event define various types of sub-elements. STAs supporting the event reporting procedure should store the last 5 events for the event report elements supported by the STAs after they are associated with an extended service set (ESS).

In the event reporting procedure, when a received event request frame includes requests for the transition event, the RSNA event, and/or the peer-to-peer link event and each event request includes one or more sub-elements, a requested STA contains available event report elements corresponding to a specified condition in an event report frame. On the other hand, when the specified event request does not include any sub-element, the requested STA contains all the available event report elements in the event report frame.

A station can be connected to plural stations and receive plural event request frames from one or more stations. An event request frame and an event report frame include a dialog token to identify the event request/report exchange. When receiving a new event request frame having a different dialog token before completing the process of previously received event request frames, a reporting station responses to only the latest received event request frame. Accordingly, when receiving a new event request frame before completing the process of previously received event request frames, the reporting station stops processing the present event request frame.

A network conditions between plural stations can vary and various events can occur in the stations. Accordingly, the stations can be exposed to various situations for event request and report. When a reporting station responses to only the latest received event request frame, it is not possible to properly cope with various situations and to efficiently manage a WLAN system. For example, when a station with wrong intention continuously transmits new event request frames to a reporting station, the reporting station cannot perform an event reporting procedure with another station.

Also, before completing the process of previously received event request frames, a station can receive another event request frame having the same dialog token. However, it is not clearly defined how to process the newly received event request frame. Accordingly, there is a need for a method of efficiently managing a WLAN system in various situations of a network.

On the other hand, the diagnostic procedure in the wireless network management procedure is to provide a means for diagnosing complex network issues and debugging a problem. For example, an AP or STA intending to collect information on a network or to solve a problem specifies a diagnosis type and transmits a diagnostic request frame to the associated stations or their neighboring stations. As the diagnostic request type, manufacture information, operating parameter, capability, and configuration profile are prescribed. When the diagnosis fails or the diagnosis service is not supported, the STA having received a diagnostic request frame collects or measures necessary information based on the request and transmits the collected or measured result along with a diagnostic report frame. In some cases, before completing the diagnostic report in response to the received diagnostic request frame, the reporting STA may receive another diagnostic request frame. In this way, when continuously receiving diagnostic request frames, it is important how the reporting STA should process the continuous diagnostic request frames.

SUMMARY OF THE INVENTION

In the event reporting procedures, when a requesting STA transmits an event request frame to request for a report of one or more event request elements, a reporting STA transmits a response message including information on the event request elements to the requesting STA. However, in some cases, the reporting STA may not have any detail to be reported for the requested event request elements. In this case, when the reporting STA does not response to the received event request frame, it causes a problem that the requesting STA cannot acquire necessary information for managing the wireless network. Accordingly, even when the reporting STA having received the event request frame does not have any detail to be reported for the event request elements specified in the received request frame, the reporting STA needs to notify the requesting STA of such information and the clear prescription of a procedure thereof helps enhance the management efficiency.

On the other hand, in the present wireless network management procedure, a method of processing information on the event request and report procedures is not clearly defined when a STA departs from an original extended service set (ESS) or an independent BSS (IBSS). Accordingly, there is a need for a method of processing information on the processing procedure when a STA moves from one ESS to another ESS or the IBSS is changed, and particularly, transition event request and report procedures in a STA moving between ESSs or IBSSs.

A peer-to-peer link event is an event type included in the event request and report procedure. When the peer-to-peer event is included in a received event request frame, a reporting STA transmits to a requesting STA an event report frame of which a connection time field includes information indicating a connection time of a peer-to-peer link. However, the known wireless network management procedure does not clearly define how to measure the peer-to-peer link connection time. Accordingly, there is a need for clearly defining the connection time to efficiently and systematically manage the wireless network.

A technical goal of the invention is to provide a wireless network management procedure of efficiently managing a network to properly cope with various situations of the network.

On the other hand, when continuously receiving diagnostic request frames, a STA cannot always process all the diagnostic request frames due to a temporal limit, a physical limit, or a user's right on use of the STA. For example, when a first STA with wrong intention continuously transmits new diagnostic request frames to a second STA and the second STA having received the continuous diagnostic request frames should always processes the new diagnostic request frames, the second STA cannot process a diagnostic request frame from a third STA. When the second STA is made to process all the continuous diagnostic request frames so as to solve the problem, the second STA should process all the continuously received diagnostic request frames and thus has no room for its inner processes.

Accordingly, another technical goal of the invention is to provide a wireless network management procedure that can process all diagnostic request frames continuously received from plural STAs and that can prevent resources from being unnecessarily consumed for processing the diagnostic request frames.

According to an aspect of one embodiment of the present invention, there is provided a management procedure for wireless local access network, the management procedure comprising: receiving one or more event request frames each of which includes zero or more event request elements, wherein each of the event request elements comprises an event type field for specifying the event type of an event request; moving to a different Extended Service Set (ESS); and cancelling all outstanding event requests of the event request frames and deleting all pending event report frames and event data.

According to another aspect of one embodiment of the present invention, there is provided a management procedure for wireless local access network, the management procedure comprising: receiving one or more event request frames each of which includes zero or more event request elements, wherein each of the event request elements comprises an event type field for specifying the event type of an event request; and transmitting an event report frame without any event report element if there is no available event report of the type specified in the event request frame.

According to further another aspect of one embodiment of the present invention, there is provided a station for supporting event service in wireless local access network, the station comprising: a processor configured to generate and process frames; and a transceiver operably connected to the processor and configured to transmit and receive the frames for the processor, wherein the transceiver is configured to receive one or more event request frames each of which includes zero or more event request elements, wherein each of the event request elements comprises an event type field for specifying the event type of an event request and to forward the received event request frames to the processor; and wherein the processor is configured to cancel all outstanding event requests of the event request frames and delete all pending event report frames and event data if the station moves to a different Extended Service Set (ESS).

According to still further another aspect of one embodiment of the present invention, there is provided a station for supporting event service in wireless local access network, the station comprising: a processor configured to generate and process frames; and a transceiver operably connected to the processor and configured to transmit and receive the frames for the processor, wherein the transceiver is configured to receive one or more event request frames each of which includes zero or more event request elements, wherein each of the event request elements comprises an event type field for specifying the event type of an event request and forward the received event request frames to the processor, wherein the processor is configured to generate an event report frame without any event report element in response to the event request frames if there is no available event report of the type specified in the event request frame and forward the generated event report frame to the transceiver, and wherein the transceiver is configured to transmit the event report frame.

BRIEF DESCRIPTION OF THE DRAWINGS

The above and other features and advantages of the present invention will become more apparent by describing in detail exemplary embodiments thereof with reference to the attached drawings in which:

FIG. 5 is a diagram illustrating a format of the event request frame according to an embodiment of the invention.

FIG. 6 is a diagram illustrating a format of an event request element included in the event request element field shown in FIG. 5.

FIG. 7 is a diagram illustrating a format of an event report frame according to an embodiment of the invention.

FIG. 8 is a diagram illustrating a format of an event report element included in the event report element field shown in FIG. 7.

FIG. 20 is a diagram illustrating a result code prepared according to an embodiment of the invention.

FIG. 21 is a diagram illustrating another result code prepared according to another embodiment of the invention.

DETAILED DESCRIPTION OF THE INVENTION

Hereinafter, a wireless network management procedure, a station supporting the procedure, and a frame format for the procedure according to exemplary embodiments of the invention will be described in detail with reference to the accompanying drawings. In the following embodiments, a wireless LAN (WLAN) system is described as a wireless communication system, but this is only exemplary. Accordingly, the embodiments to be described below can be applied to wireless communication systems other than the WLAN system, as long as they can be permitted in nature. In this case, terms or words specific to the WLAN system used in the embodiments can be properly modified into terms or words customarily used in the corresponding wireless communication system.

Figure 1:
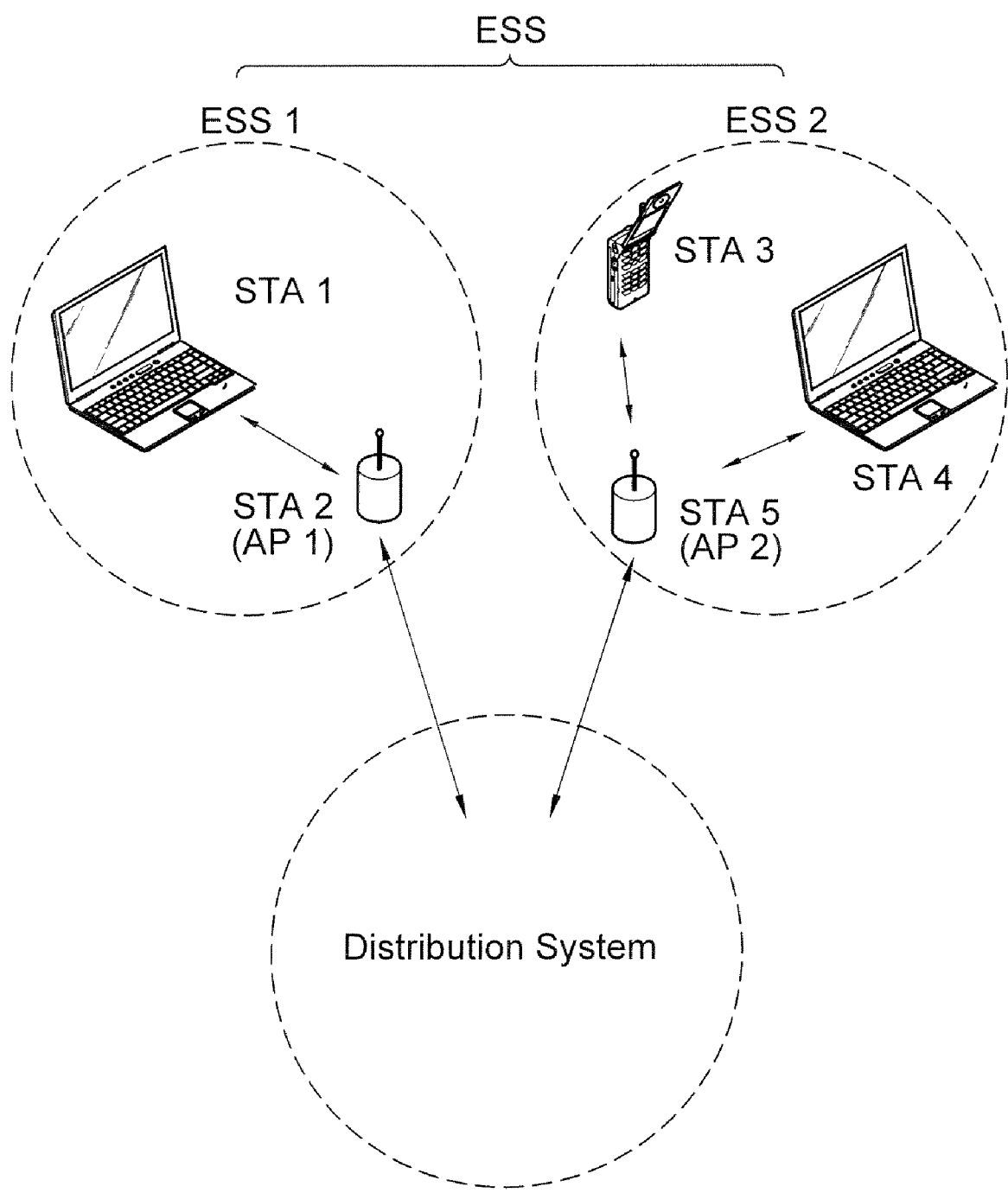
FIG. 1 schematically shows configurations of an example of a WLAN system to which the embodiments of the present invention can be applied.
Figure 2:
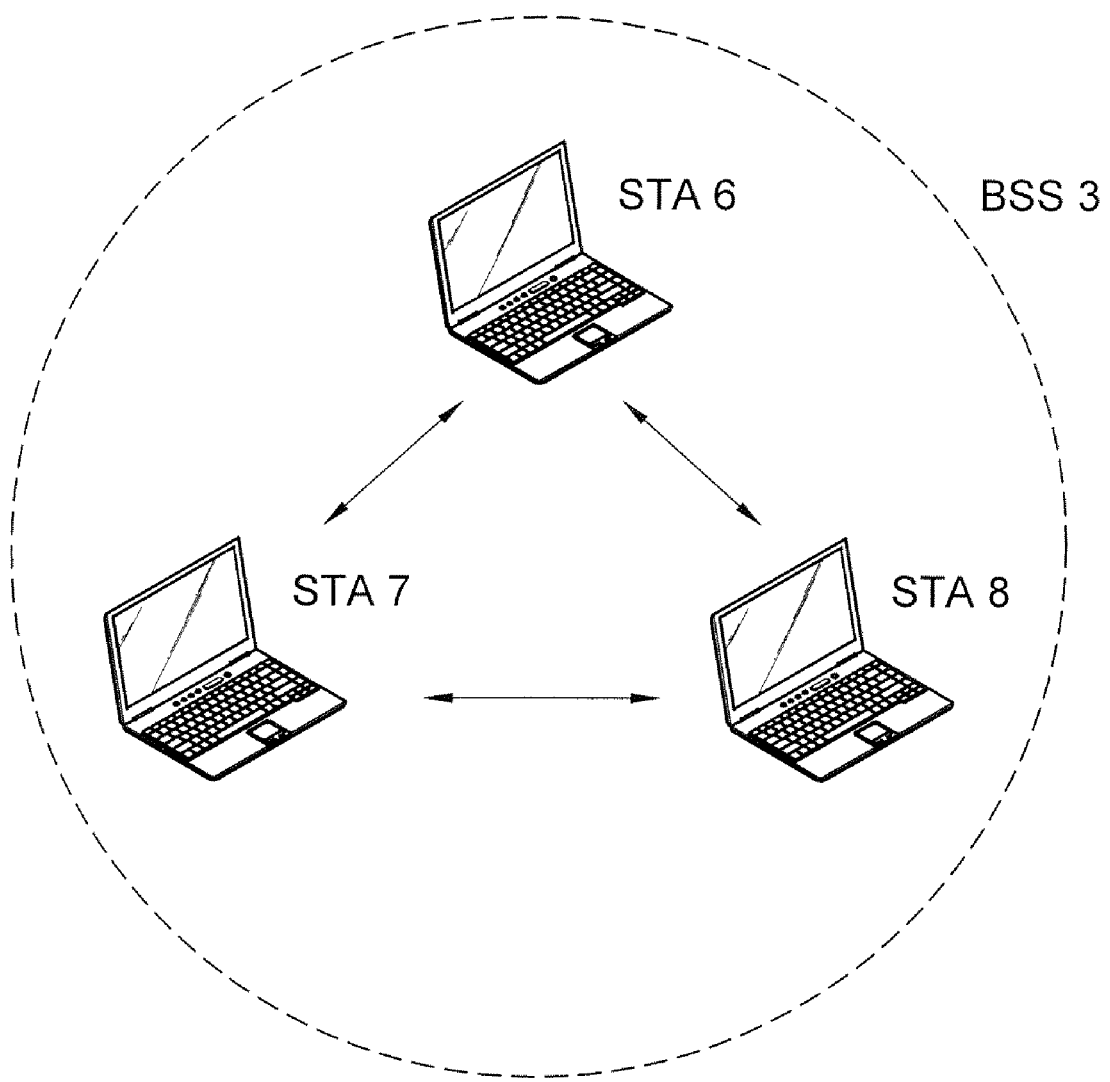
FIG. 2 schematically shows configurations of another example of a WLAN system to which the embodiments of the present invention can be applied.

FIGS. 1 and 2 schematically show configurations of examples of a WLAN system to which the embodiments of the present invention can be applied.

As shown in FIGS. 1 and 2, a WLAN system includes one or more basic service sets (BSS). The BSS is a set of stations (STAs) which can be successfully synchronized and communicate with each other, but is not a concept indicating a specific area. The BSS can be classified into an infrastructure BSS and an independent BSS (IBSS). The former is shown in FIG. 1 and the latter is shown in FIG. 2. The infrastructure BSSs BSS1 and BSS2 include one or more Non-AP STAs STA1, STA2, STA3, and STA4, an access point (AP) which is a STA providing a distribution service, and a distribution system (DS) connecting plural APs AP1 and AP2. On the contrary, the IBSS does not include an AP and all the STAs are mobile stations STA6, STA7, and STA8. In the IBSS, an access to the DS is not permitted, thereby constituting a self-contained network.

A STA is a functional unit including a medium access control (MAC) interface and a physical layer interface for a wireless medium in accordance with the IEEE 802.11 standard and includes both APs and non-AP stations in a wide meaning. A station for wireless communication includes a processor and a transceiver and further includes a user interface and a display unit. The processor is a functional unit designed to generate a frame to be transmitted through a wireless network or to process a frame received through the wireless network and serves to perform a variety of functions of controlling the station. The transceiver is operably connected to the processor and is a unit designed to transmit and receive frames through a wireless network.

A portable terminal operated by a user is a non-AP STA (STA1, STA3, STA4, STA6, STA7, and STA8). Simply, a STA may mean a non-AP STA. The non-AP STA may be called a wireless transmitting/receiving unit (WTRU), a user equipment (UE), a mobile station (MS), a portable terminal, or a mobile subscriber unit.

The AP (AP1 and AP2) is a functional entity providing connection to the DS through a wireless medium for the associated stations. A communication between the non-AP STAs in the infrastructure BSS including an AP is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the ESS can communicate with each other and the non-AP STAs can move from one BSS to another BSS while communicating without any interception.

The DS is a mechanism for allowing an AP to communicate with another AP. Accordingly, the AP can transmit a frame for the STAs associated with the ESS managed by the AP, forward a frame when a STA moves to another BSS, or forward a frame to an external network such as a wired network. The DS may not be a network necessarily, and is not limited in type as long as it can provide a predetermined distribution service defined in the IEEE 802.11 standard. For example, the DS may be a wireless network such as a mesh network or a physical structure for connecting the APs to each other.

Figure 3:
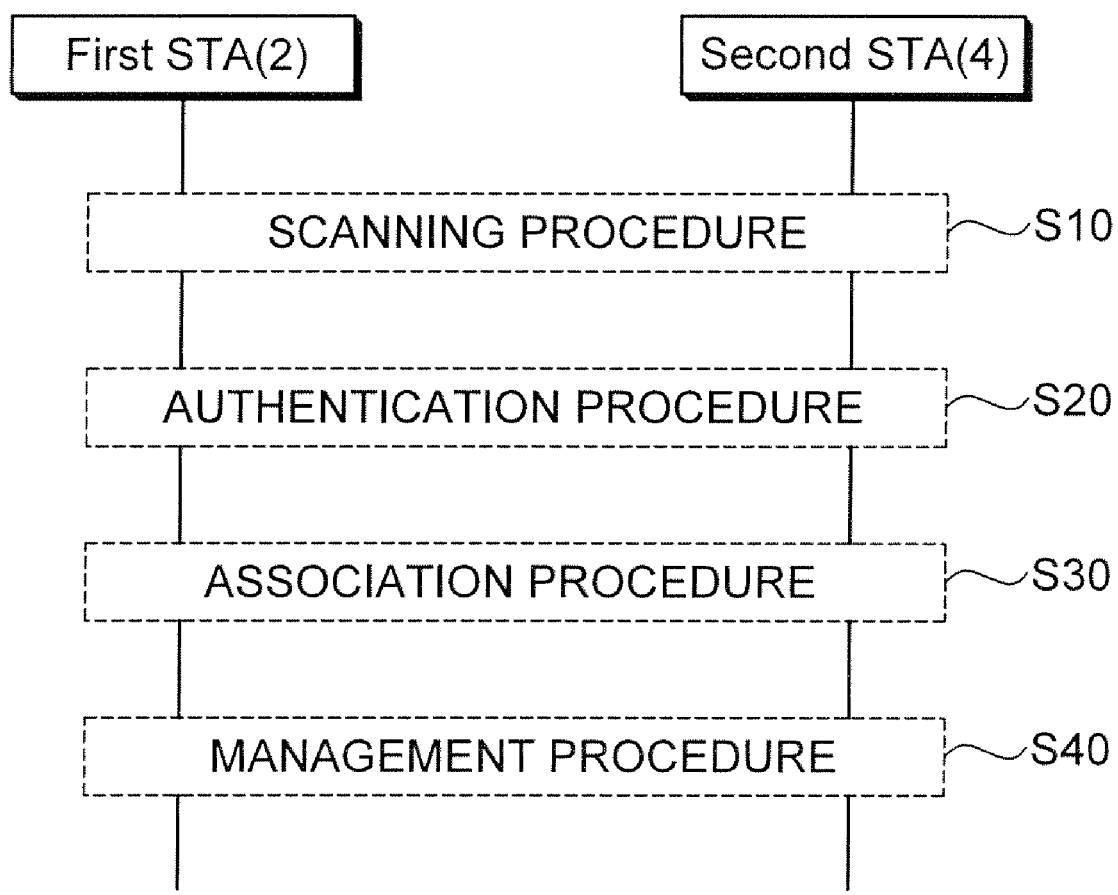
FIG. 3 is a flowchart illustrating a management procedure of a wireless network in a wireless LAN system.

FIG. 3 is a flowchart illustrating a management procedure of a wireless network in a wireless LAN system shown in FIG. 1 or 2 or in a wireless communication system including the wireless LAN system or equivalent thereto according to an embodiment of the invention.

Referring to FIG. 3, a radio measurement procedure in a wireless communication system according to the embodiment of the invention further includes as preliminary procedures a scanning procedure (S10), an authentication procedure (S20), and/or an association procedure (S30) and further includes a management procedure (S40) which is performed after the preliminary procedures S10 to S30. According to the embodiment of the invention, some procedures of the preliminary procedures may not be essential but arbitrary.

Referring to FIG. 3, the scanning procedure S10 is first performed between the first STA 2 and the second STA 4. The scanning procedure S10 is a procedure for allowing the first STA 2 to search for a candidate station to be associated in the association procedure S30, for example, a procedure for allowing a non-AP STA to search for an AP in the infrastructure BSS. However, the scanning procedure in a wider meaning may include a procedure for allowing a non-AP STA to search for a neighboring non-AP STA in the IBSS or a procedure for allowing an MP to search for its neighboring MP in a mesh network.

The scanning procedure can be classified into two types. One is a passive scanning method using a beacon frame transmitted from APs including the second STA 4. In this method, the first STA 2 to access a wireless LAN can search for an accessible BSS by receiving a beacon frame periodically transmitted from the second STA 4 which is an AP managing the corresponding BSS. The passive scanning method can be applied when the second STA 4 is an AP transmitting a beacon frame.

The other is an active scanning method. In this method, the first STA 2 to access a wireless LAN system, for example, an AP, first transmits a probe request frame. The second STA 4 having received the probe request frame transmits a probe response frame including a service set ID (SSID) of the BSS managed by the AP and information on capabilities supported by the AP. Accordingly, the first STA 2 can know existence of a candidate AP and a variety of information on the candidate AP from the received probe response frame.

Referring to FIG. 3, the authentication procedure S20 is performed between the first STA 2 and the second STA 4. The authentication procedure S20 is a procedure for negotiating an authentication process and an encoding method between entities participating in a wireless communication. For example, the first STA 2 can perform the authentication procedure S20 to be associated of one or more APs, which had searched for in the scanning procedure S10. In the WLAN, since an open system authentication method is used in most cases, the second STA 4 as an AP performs the authentication process without any condition in response to the authentication request from the first STA 2. Reinforced authentication methods include EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol) based on the IEEE 802.1x standard.

When the authentication process is successfully completed in the authentication procedure S20, the first STA 2 performs the association procedure S30. The association procedure S30 may be an arbitrary procedure which is performed when the first STA 2 is a non-AP STA and the second STA 4 is an AP. The association procedure S30 is to set up an identifiable link, that is, a wireless link, between the first STA 2 and the second STA 4. In the association procedure S30, the first STA 2 transmits an association request frame to the second STA 4 having successfully completed the authentication procedure S20 and the second STA 4 transmits to the first STA 2 an association response frame having a state value of "successful" in response to the association request frame. The association response frame includes an identifier for identifying the association with the first STA 2, for example, an association ID (AID).

When the association procedure S30 has been successfully completed but the connection state between the first STA 2 and the second STA 4 may be deteriorated due to a variable channel condition, the first STA 2 can perform the association procedure with another accessible AP again, which is called a re-association procedure. The re-association procedure is very similar to the above-mentioned association procedure S30. More specifically, in the re-association procedure, the first STA 2 transmits a re-association request frame to a different AP (an AP having successfully completed the authentication procedure S20 among the candidate APs searched for in the scanning procedure S10) other than the AP currently associated therewith, and the different AP transmits a re-association response frame to the first STA 2. However, the re-association request frame further includes information on the AP previously associated therewith and the re-associated AP can transmit data buffered in the second STA 4, which is an existing AP, using the information.

Referring to FIG. 3, the management procedure (S40) is performed between the first STA 2 and the second STA 4 having completed the authentication procedure S20 and/or the association procedure S30 in addition thereto. Although it has been shown in FIG. 3 that the management procedure is performed between the first STA 2 and the second STA 4 having completed the association procedure S30 in the infrastructure BSS, the radio measurement procedure S40 described later according to an embodiment of the invention is not limited to the figure.

Figure 4:
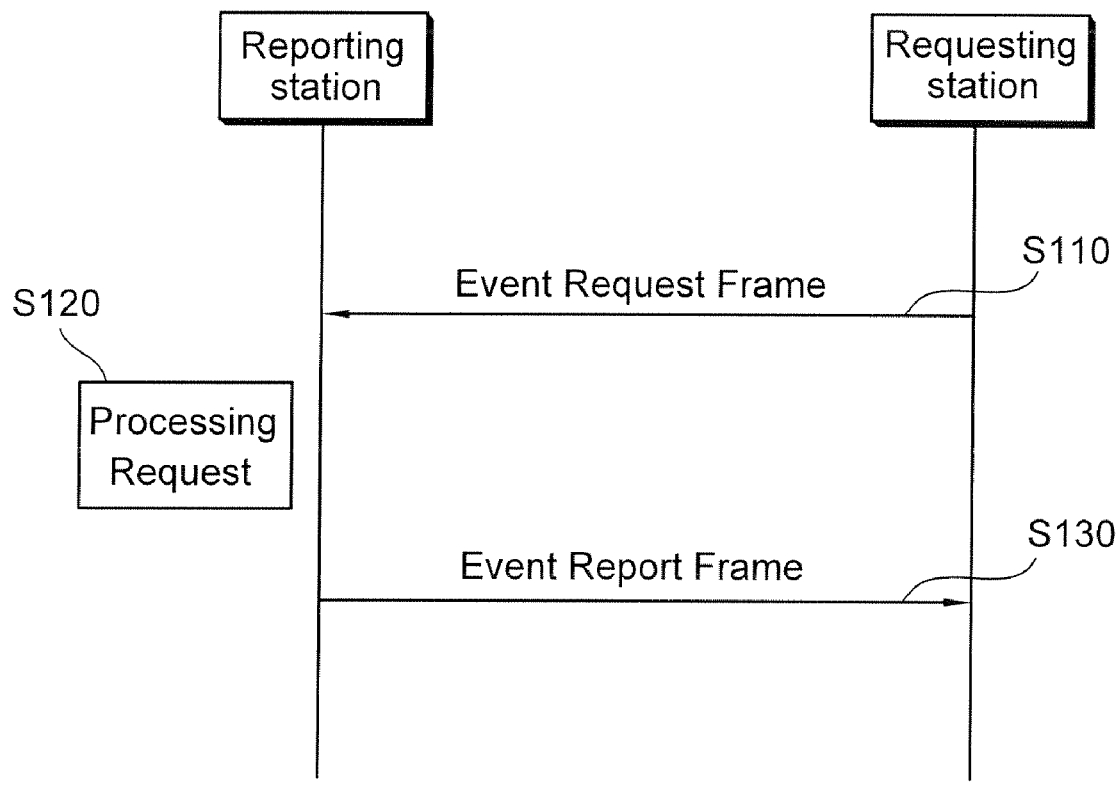
FIG. 4 is a flow diagram illustrating a wireless network management procedure according to a first embodiment of the invention, which relates to an event reporting procedure.

FIG. 4 is a flow diagram illustrating a wireless network management procedure according to a first embodiment of the invention, which relates to an event report procedure. The event report procedure including exchange of an event request frame and an event report frame makes real-time network diagnosis possible. For example, an AP intending to collect event information of non-AP STAs in an infrastructure BSS can transmit an event request frame having an event type or not having an event request field to one or more non-AP STAs. The non-AP STAs having received the event request frame can transmit an event report frame including information on the requested event type or information on the all the event types to the AP. The event request frame and the event report frame are transmitted in a unicast manner. When a destination address of the event request/report frame is a multicast address or a broadcast address, the frame is discarded.

In this embodiment, a station transmitting an event request frame is called a requesting station and a station transmitting an event report frame is called a reporting station or a requested station. In this embodiment, the requesting station is an access point (AP) and the reporting station is a non-AP STA. Alternatively, in the wireless network management procedure in the IBSS, the requesting station and the reporting station may both be a non-AP STA.

Referring to FIG. 4, the requesting station transmits an event request frame to the reporting station (S110). The event request frame can include one or more event request elements. The event request frame can further include a field for specifying the number of requested report elements (for example, a count field or an event response limit field).

The event request elements of the event request frame include a field for specifying an event type (for example, an event type field). The event type can include, for example, a transition event, an RSNA event, a peer-to-peer link event, and a system log event. A variety of sub-elements can be defined in each event type. The count field or the event response limit field of the event request frame represents the number of event report elements to be included in the event response frame or the number of sub-elements included in the corresponding event report element. The format of the event request frame will be described in detail later.

The requested station or the reporting station processes the received event request frame (S120). The reporting station can store information on the latest 5 events every event type after accessing the AP in the ESS. In general, the reporting station confirms the event types included in the event request frame or the sub-elements of each event type and contains relevant event information in the event report frame. In this case, the reporting station shall only include event report elements for the requested event types as many as the event response limit field or the count field. When no event information is stored for the event type specified in the event request frame, that is, when there is no available event report, the reporting station generates an event report frame not including any event report element.

The reporting station transmits the generated event report frame to the requesting station in response to the event request frame (S130). The event report frame can include the same number of event report elements as specified in the event response limit field or the count filed for the requested event type. If the event report elements do not fit into a single MMPDU, the reporting station shall send the remaining elements in additional event report frames until all the event report elements have been returned to the requesting station.

FIG. 5 is a diagram illustrating a format of the event request frame according to an embodiment of the invention. The event request frame is used to allow a station (requesting station) to request another station (requested station or reporting station) for one or more event information on one or more event report elements, similarly to step S110 of FIG. 4. Referring to FIG. 5, the event request frame includes a category field, an action field, a dialog token field, and one or more event request element fields.

The category field is set to a value indicating that the corresponding frame belongs to a wireless network management category, and for example, has a size of 1 octet. The action field is set to a value indicating that the frame is an event request frame, and for example, has a size of 1 octet. The dialog token field is used to identify the exchange of frame between stations, and is set to a value selected by the station (that is, the requesting station) transmitting the event request frame so as to identify the exchange of the event request frame and the event report frame. The dialog token field has, for example, a size of 1 octet.

The event request element field is a field including one or more event request elements and the size thereof is variable. The size and number of event request element fields included in the event request frame can be limited by the set size of a MAC management protocol data unit (MMPDU).

FIG. 6 is a diagram illustrating a format of an event request element included in the event request element field shown in FIG. 5. Referring to FIG. 6, the event request element includes an element ID field, a length field, an event token field, an event type field, and an event request field. The event request element may further include an event count field.

The element ID field is set to a value indicating that the information element is an event request element. The length field is set to various values depending on the length of the event request field. The event token field is set to a specific value for identifying the event request element and an event report element corresponding thereto. The event type field indicates an event type to be requested using the event request element. Table 1 shows examples of the event type.

TABLE 1

| Name | Event Type |
|---|---|
| Transition Event Request | 0 |
| RSNA Event Request | 1 |
| Peer-to-Peer Link Event Request | 2 |
| System Log (Syslog) Request | 3 |
| Reserved | 4-255 |

The event count field is set to a value indicating the number of requested events, that is, the number of event report elements for which the requesting station requests the reporting station or the requested station for the event type specified in the event type field. Accordingly, the reporting station having received the event request frame including the event request element can transmit the event report frame including the event report elements as many as the latest events corresponding to the event type specified in the event type field being specified in the event count field. Here, the title of the event count field is exemplary and may be called, for example, an event response limit field.

In this embodiment, the requesting station can specify the number of event report elements to be received for the corresponding event type, when transmitting the event request frame. Unlike the existing procedure of transmitting all the event information corresponding to the event type when the event request field is not included in the event request element, the reporting station transmits to the requesting station the event report elements as many as the value specified in the event count field or the event response limit field. Accordingly, according to this embodiment, it is possible to reduce the burden on the WLAN system including the requesting STA and the requested STA and to improve the utilization efficiency of wireless channels, thereby efficiently managing the wireless network.

Referring to FIG. 6, the event request element includes an event request field corresponding to the event type. The event request field of the event request element includes a transition event request, an RSNA event request, a peer-to-peer link event request, and a system log (Syslog) request. However, the system log event is used to provide the requesting station with human-readable vendor specific information on the reporting station, and may not include any particular sub-element.

Table 2 shows an example of sub-elements and IDs of the sub-elements included in the event request field of the event request element when the event type of the event request element is set to a value indicating the transition event request. Referring to Table 2, the sub-elements of the event request field can include 0 or one or more sub-elements of a target BSSID transition sub-element, a source BSSID transition sub-element, a transition time sub-element, a transition result sub-element, and a frequent transition sub-element.

TABLE 2

| Transition Event Request Sub-element | Sub-element ID |
|---|---|
| Target BSSID Transition | 0 |
| Source BSSID Transition | 1 |
| Transition Time | 2 |
| Transition Result | 3 |
| Frequent Transition | 4 |
| Reserved | 5-255 |

Table 3 shows examples of sub-elements and IDs of the sub-elements included in the event request field of the event request element when the event type of the event request element is set to a value indicating the RSNA event request. Referring to Table 2, the sub-elements of the RSNA event request can include a target BSS RSNA sub-element, an authentication type sub-element, an extensible authentication protocol (EAP) method sub-element, and an RSNA result sub-element.

TABLE 3

| RSNA Event Request Sub-element | Sub-element ID |
|---|---|
| Target BSS RSNA | 0 |
| Authentication Type | 1 |
| EAP Method | 2 |
| RSNA Result | 3 |
| Reserved | 4-255 |

Table 4 shows examples of sub-elements and IDs of the sub-elements included in the event request field of the event request element when the event type of the event request element is set to a value indicating the peer-to-peer link event request. The peer-to-peer link event request is used to provide a peer-to-peer connectivity event of the reporting station. Referring to Table 4, the sub-elements of the peer-to-peer link event request include a peer-to-peer STA address sub-element and a channel number sub-element.

TABLE 4

| Peer-to-Peer Link Event | |
|---|---|
| Request Sub-element | Sub-element ID |
| Peer STA Address | 0 |
| Channel Number | 1 |
| Reserved | 2-255 |

FIG. 7 is a diagram illustrating a format of an event report frame according to an embodiment of the invention. The event report frame is used to allow the reporting station or the requested station to provide the requesting station with report information on the requested event type in response to the received event request frame, similarly to step S130 of FIG. 4. Referring to FIG. 7, the event report frame includes a category field, an action field, a dialog token field, and an event report element field.

The category field is set to a value indicating that the frame belongs to a wireless network management category, and for example, has a size of 1 octet. The action field is set to a value indicating that the frame is an event report frame, and for example, has a size of 1 octet. The dialog token field is set to the same value as set in the received event request frame and has, for example, a size of 1 octet.

The event report element field is a field including zero or one or more event request elements and the size thereof is variable. The size and number of event request elements is limited by the set size of the MMPDU. According to this embodiment, the event report element field includes the event report elements as many as the number of event report elements specified in the event response limit field or the event count field of the received event request frame. If there is no available Event report of the type specified in the Event Request frame, the reporting STA shall send Event Report frame without any Event Report elements. If the Event Report elements do not fit into a single MMPDU, the reporting station shall send the remaining elements in additional Event report frames until all Event report elements have been returned to the requesting station.

FIG. 8 is a diagram illustrating a format of an event report element included in the event report element field shown in FIG. 7. Referring to FIG. 8, the event report element includes an element ID field, a length field, an event token field, an event type field, a status field, an event timestamp field, and an event report field. The element ID field is set to an ID value indicating an event report element of various information elements. The length field is set to various values depending on the length of the event report field. The event token field is set to a value indicating an event token corresponding to the event request element of the event request frame. The event type field indicates a type of the event report. Table 5 shows examples of the event report types.

TABLE 5

| Name | Event Type |
|---|---|
| Transition Event Report | 0 |
| RSNA Event Report | 1 |
| Peer-to-Peer Link Event Report | 2 |
| System (Syslog) Report | 3 |
| Reserved | 4-255 |

The status field indicates the entire response results to the event request/report exchange indicated by the dialog token. The response results to the event request include "successful", "fail", "refused", and "incapable." The "successful" indicates that the reporting STA can response using one or more event response element, the "fail" indicates that the reporting STA cannot process the received event request element within the predetermined time, the "refused" indicates that the reporting STA cannot accept the received event request element, and the "incapable" indicates that the reporting STA does not have the capability of generating the event report of the type specified in the event request frame, which are only an example. As described later, some of the response results may be used as a different meaning, or a response result indicating another status may be added thereto.

The event timestamp field indicates a timing synchronization function (TSF) timer value of the station of which an event is recorded. The event report field includes an event report corresponding to the event type. The event timestamp field and the event report field are provided when the size of the status field is "0", that is, when the status field is omitted. The event report includes a transition event report, an RSNA event report, a peer-to-peer link event report, and a system log (Syslog) report.

In the event request and report procedure according to the embodiment of the invention, when no event information or no event report element to be transmitted is included in the received event request element, it is not clear how the reporting STA should process this case. That is, when the reporting STA receives the event request frame including one or more event request elements from the requesting STA but does not have information to be reported for the event request elements specified in the event request frame, it is not clear that the reporting STA should response to the received event request frame. Accordingly, an embodiment of the invention suggests using one of three methods described below.

The first method is to use a status subfield of the event report frame. More specifically, the "incapable" value of the information to be set in the status subfield is made to indicate that there is no event report element. In this embodiment, since the "incapable" value used in the past can be used as it is, the reporting STA can notify to the requesting STA that there is no information to be reported for the requested event report type, without influencing the past procedure regarding the event request frame and the event report frame.

The "incapable" originally indicates that the reporting STA does not have the capability of processing the requested event report element. However, when a non-AP STA actually accesses an AP, the non-AP STA as the reporting STA notifies to the AP as the requesting STA the "incapable as "capability information" or "extended capability information" for a function supported by the non-AP STA. Accordingly, even when the "reporting STA" transmitting the event report frame does not insert the information of "incapable" thereto, the "requesting STA" can know that the "reporting STA" does not support the relevant procedure.

In this way, the "incapable" of the values inserted into the "status subfield" is unclear in usage in the wireless network management procedure. Accordingly, as suggested in the first method, the "incapable" is exclusively used for the case where "there is no event report element to be reported", the wireless network management procedure is not influenced at all.

A second method uses the status subfield of the event report frame. More specifically, the case where "there is no event information element to be reported" is newly defined as a value that can be inserted into the "status subfield." For example, the case where "there is no event information element to be reported" is defined as "not available" and one of the reserved values is assigned thereto. In this embodiment, the "reporting STA" can express that there is no information to be reported for the requested report element, by containing the value of "not available" in the "status subfield."

In a third method, no information is included in the event report element field of the event report frame. In this case, the status subfield of the event report frame is set to a value indicating "successful", which is only an example. In this method, when no information is included in the event type subfield of the event report element field but the value indicating the "successful" is included in the status subfield, this case may be defined as indicating the case where "there is no event report element to be reported."

In the above-mentioned event request and report procedure, the non-AP STA as the reporting STA stores various information on the events carried out in one ESS or IBSS and reports the stored information in response to the received event request frame. That is, the event request and report procedure is based on the premise that the reporting STA stays in the same ESS or IBSS. However, since the non-AP STA can freely move to another ESS or belong to another IBSS, it is necessary to prescribe a processing procedure for the case in the event request and report procedure.

When a non-AP STA moves to a different ESS, the non-AP STA need not store the event information of the previous ESS any more. The non-AP STA need not response to the event request frames received from the AP of the previous ESS any more. Accordingly, the non-AP STA preferably removes all the outstanding event requests.

In the wireless network management procedure according to the embodiment of the invention, the non-AP STA departing from the ESS to which it has belonged should remove or cancel the previously received event requests, and remove all the stored information on the event report in the previous ESS. Accordingly, when the non-AP STA departs from the ESS or moves to a different ESS, the buffer of the non-AP STA is cleared, thereby improving the performance and/or operation speed of the non-AP STA. Particularly, the non-AP STA does not store unnecessary information any more, thereby enhancing the utilization efficiency of the buffer.

In the wireless network management procedure according to the embodiment of the invention, the procedure of removing or canceling the previously received event requests and removing the information on the event report stored in the buffer when the non-AP STA in the infrastructure BSS departs from the ESS or moves to a different ESS can be similarly applied to the case where the non-AP STA moves to a different IBSS. However, when the non-AP STA forms the IBSS, the transition event request and report procedure and the RSNA event request and report procedure cannot be similarly applied to the non-AP STA in view of characteristics. However, the operation of the non-AP STA at the time of changing the ESS can be applied similarly when the IBSS is changed in association with the peer-to-peer link event request and report.

On the other hand, in the wireless network management procedure for preparation of the event report frame including the peer-to-peer link information, it is prescribed that the peer-to-peer link connection time should be reported. The peer-to-peer link connection time is a time when a peer-to-peer link is set up between non-AP STA to use radio resources and is information considerably important for the network management. Accordingly, the information on the peer-to-peer link connection time should include accurate time information on the actual use of the radio resources.

In the wireless network management procedure, it is prescribed that the connection time includes a time value calculated in the unit of second, and it is also prescribed that the connection time is a difference between the first time when frames could be transmitted between the "reporting STA" and the corresponding peer STA and the time when the peer-to-peer link is torn down or the present time when the peer-to-peer link is still active. However, the first time when frames could be transmitted between the "reporting STA" and the corresponding peer STA is not very clear.

Figure 9:
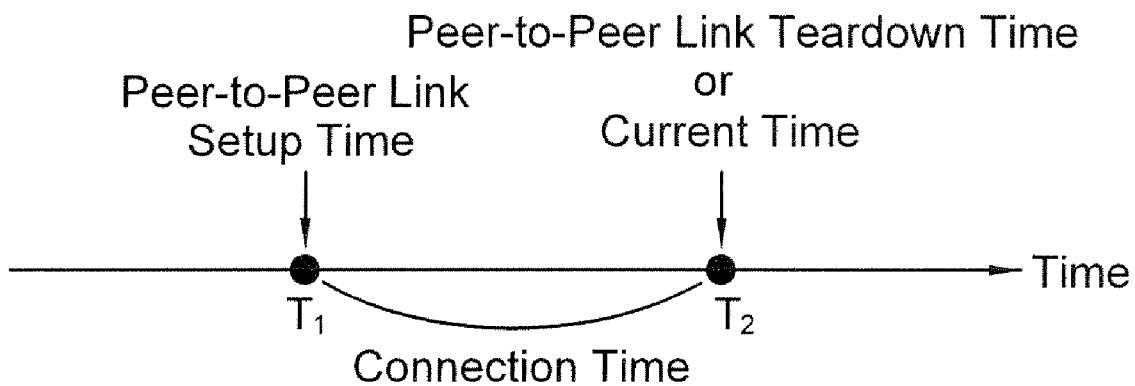
FIG. 9 schematically shows the connection time of a peer to peer link in the management procedure according to another embodiment of the present invention.

Accordingly, in the wireless network management procedure according to the embodiment of the invention, as shown in FIG. 9, the connection time is defined as a difference value ($T_{connection\ time}$=T2−T1) between a peer-to-peer link setup time (T1) and a peer-to-peer link teardown time or the present time (T2) when the peer-to-peer link is still active, thereby making the start time of the peer-to-peer link clear. In general the time for starting the setup of the peer-to-peer link is a time for receiving a confirmation frame in response to the frame requesting for opening the link, and thus it is possible to clearly define the connection time by defining the peer-to-peer link setup time as the start time of the connection time. Accordingly, according to the embodiment of the invention, it is possible to know the accurate peer-to-peer link connection time, thereby managing the wireless network on the basis of more accurate information.

Figure 10:
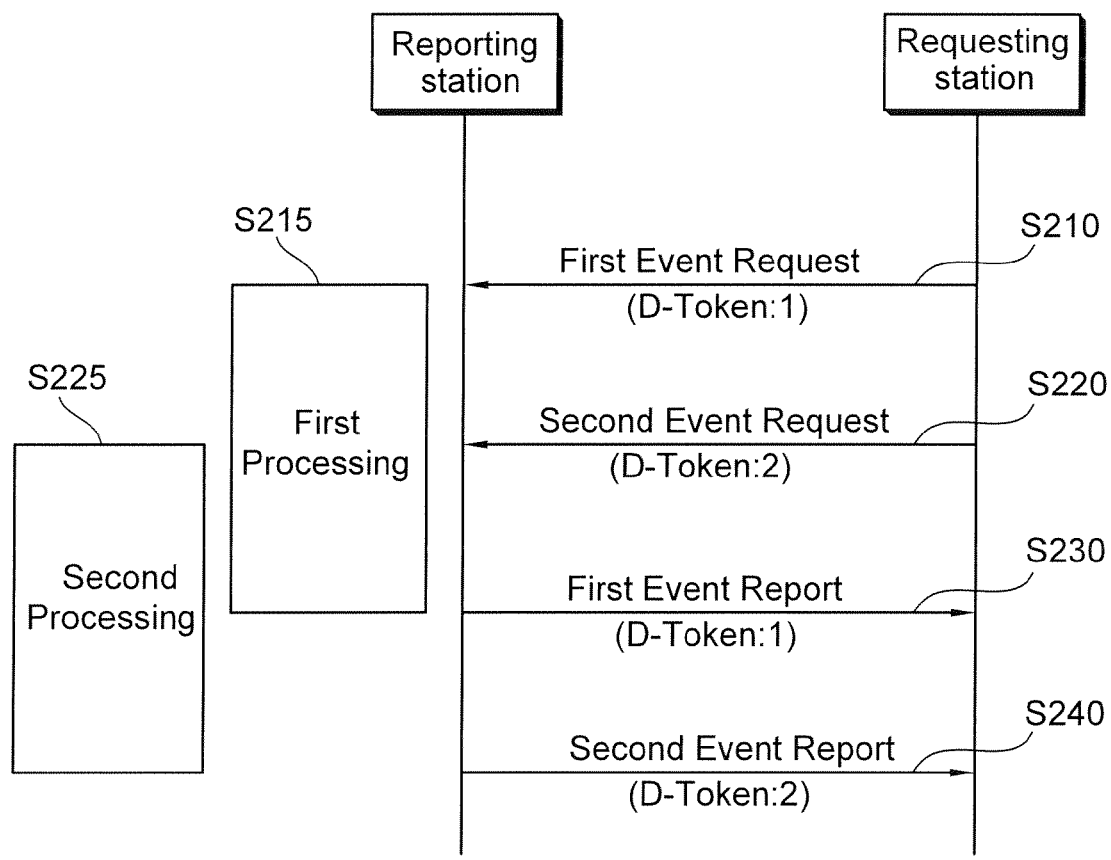
FIG. 10 is a flow diagram illustrating a wireless network management procedure according to another embodiment of the invention.

Next, a wireless network management procedure according to another embodiment of the invention will be described. FIG. 10 is a flow diagram illustrating a wireless network management procedure according to another embodiment of the invention. In this embodiment, it is assumed that a reporting STA continuously receives event request frames having different dialog tokens from the same request STA.

Referring to FIG. 10, a requesting STA transmits a first event request frame (S210). It is assumed that a dialog token (D-token) included in the first event request frame is "1." A reporting STA having received the first event request frame starts processing the first event request frame (first process) (S215). The reporting STA stores event information on a transition event, an RSNA event, a peer-to-peer link event, and a system log event since it is connected to an AP in an ESS. The reporting STA can store information on the latest 5 events by event types. The reporting STA generates an event report frame to correspond to the type and number of events requested in the first request frame of the stored event information. The generated event report frame is transmitted to complete the process of the first event request frame.

The reporting STA may receive a second event request frame from the same requesting STA in the course of processing the first event request frame (S220). It is assumed that the dialog token included in the second event request frame is "2." The reporting STA compares the dialog token included in the second event request frame with the dialog token included in the first event request frame. When the dialog token of the first event request frame is not equal to the dialog token of the second event request frame, the reporting STA does not stop processing the first event request frame. Then, the reporting STA starts processing the second event request frame (second process) (S225).

When the process of the first event request frame is completed, the reporting STA transmits a first event report frame to the requesting STA in response to the first event request frame. The first event report frame includes the same dialog token as the first event request frame and includes information on the event elements requested in the first event request frame. When the process of the second event request frame is completed, the reporting STA transmits a second event report frame to the requesting STA in response to the second request frame (S240). The second event report frame includes the same dialog token as the second event request frame and includes information on the event elements requested in the second event request frame.

Therefore, according to this embodiment, when a STA receives event request frames with different dialog tokens from the same requesting STA, the STA shall respond orderly to all the requests.

Figure 11:
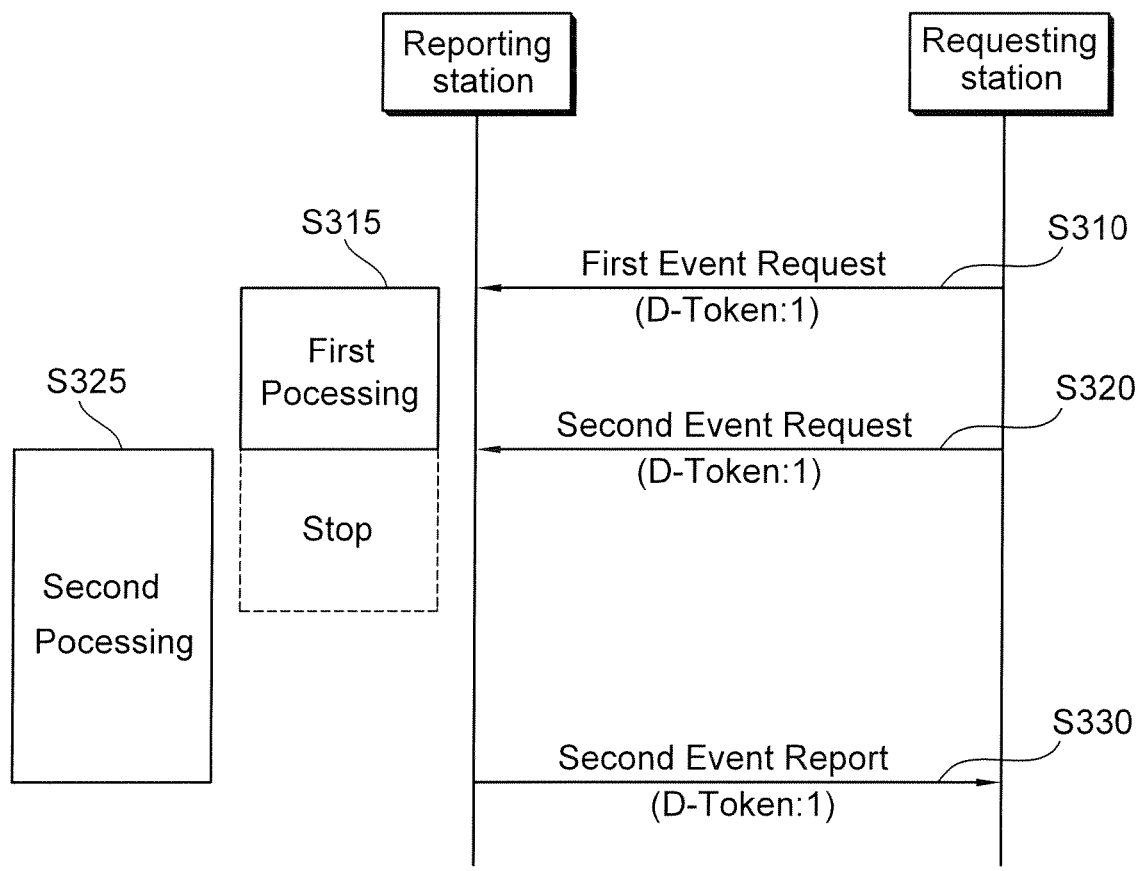
FIG. 11 is a flow diagram illustrating a wireless network management method according to another embodiment of the invention.

FIG. 11 is a flow diagram illustrating a wireless network management method according to another embodiment of the invention. In this embodiment, it is assumed that event request frames having the same dialog token are continuously received from the same requesting STA.

Referring to FIG. 11, a requesting STA transmits a first event request frame (S310). It is assumed that the dialog token (D-token) included in the first event request frame is "1." A reporting STA having received the first event request frame starts processing the first event request frame (first process) (S315). The reporting STA generates a first event report frame to correspond to the type and number of events requested in the first event request frame from the stored event information.

The reporting STA receives a second event request frame from the same requesting STA in the course of processing the first event request frame (S320). It is assumed that the dialog token included in the second event request frame is "1." The reporting STA compares the dialog token included in the first event request frame and the dialog token included in the second event request frame with each other. When the dialog token of the first event request frame is equal to the dialog token of the second event request frame, the reporting STA stops processing the first event request frame and starts processing the second event request frame (second process) (S325). When the process of the second event request frame is completed, the reporting STA transmits a second event report frame to the requesting STA in response to the second event request frame (S330). The second event report frame includes the same dialog token as the second event request frame and includes information on event elements requested in the second event request frame.

Therefore, according to the present embodiment, when a STA receives a subsequent event request frame with the same dialog token from the same requesting STA before the event report to the previous request has been completely processed, the STA shall respond only to the latest request.

Figure 12:
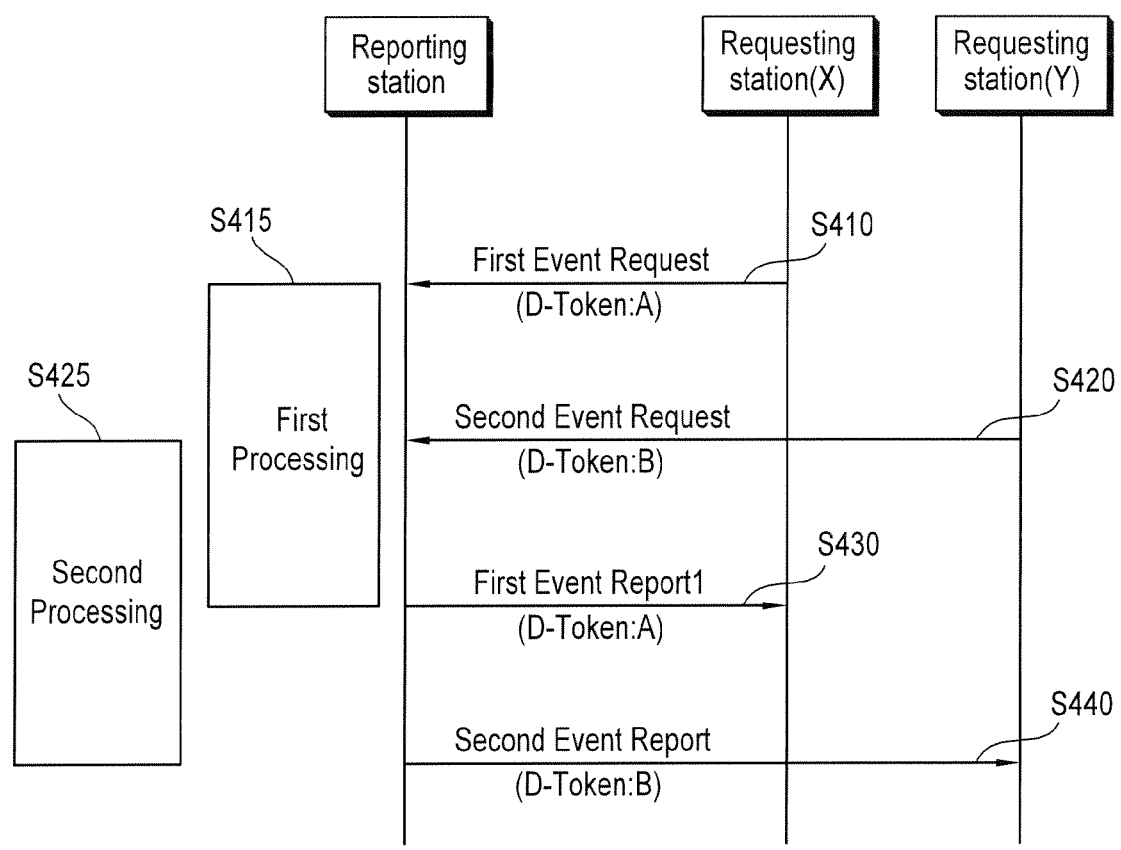
FIG. 12 is a flow diagram illustrating a wireless network management method according to another embodiment of the invention.

FIG. 12 is a flow diagram illustrating a wireless network management method according to another embodiment of the invention. In this embodiment, event request frames are received from different requesting STAs.

Referring to FIG. 12, a first requesting STA X transmits a first event request frame (S410). It is assumed that the dialog token (D-token) included in the first event request frame is "A." A reporting STA having received the first event request frame starts processing the first event request frame (first process) (S415). The reporting STA generates a first event report frame to correspond to the type and number of events requested in the first event request frame from the stored event information.

The reporting STA receives a second event request frame from a second requesting STA Y in the course of processing the first event request frame (S420). It is assumed that the dialog token included in the second event request frame is "B." When receiving the second event request frame from the second requesting STA different from the first requesting STA having transmitted the first event request frame, the reporting STA does not stop processing the first event request frame. At this time, the dialog token of the first event request frame and the dialog token of the second event request frame may be equal to or different from each other, but the reporting STA need not compare the dialog token of the first event request frame and the dialog token of the second event request frame with each other.

The reporting STA starts processing the second event request frame (second process) (S425). When the process of the first event request frame is completed, the reporting STA transmits a first event report frame to the requesting STA in response to the first event request frame (S430). When the process of the second event request frame is completed, the reporting STA transmits a second event report frame to the requesting STA in response to the second event request frame (S440).

Therefore, according to this embodiment, when a STA receives event request frames from different requesting STAs, the STA shall respond orderly to all the requests.

Figure 13:
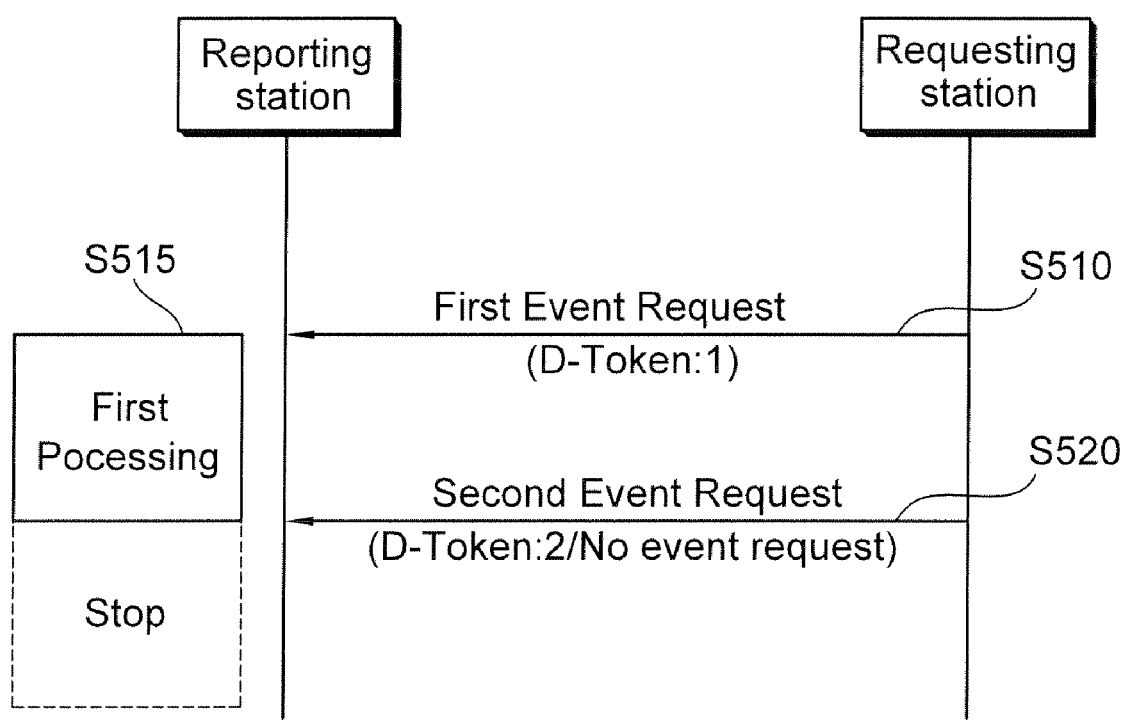
FIG. 13 is a flow diagram illustrating a wireless network management procedure according to another embodiment of the invention.

FIG. 13 is a flow diagram illustrating a wireless network management procedure according to another embodiment of the invention. In this embodiment, event request frames having different dialog tokens and not including an event request field are continuously received from the same requesting STA.

Referring to FIG. 13, a requesting STA transmits a first event request frame (S510). It is assumed that the dialog token (D-token) included in the first event request frame is "1." A reporting STA having received the first event request frame starts processing the first event request frame (first process) (S515). The reporting STA generates a first event report frame to correspond to the type and number of events requested in the first event request frame from the stored event information.

The reporting STA receives a second event request frame from the same requesting STA in the course of processing the first event request frame (S520). It is assumed that the second event request frame includes a dialog token of "2" and does not include an event request field. The reporting STA compares the dialog token included in the first event request frame with the dialog token included in the second event request frame. When the dialog token of the first event request frame is different from the dialog token of the second event request frame, the reporting STA confirms the event request field of the second event request frame. When the event request field is not included in the second event request frame, the reporting STA stops processing the first event request frame. The reporting STA does not process the second event request frame. That is, the second event request frame serves to stop processing the first event request frame.

Therefore, according to this embodiment, when a STA receives event request frame with different dialog tokens and without event request field from the same requesting STA before the event report to the previous request has been completed, the STA shall stop responding to the request.

Figure 14:
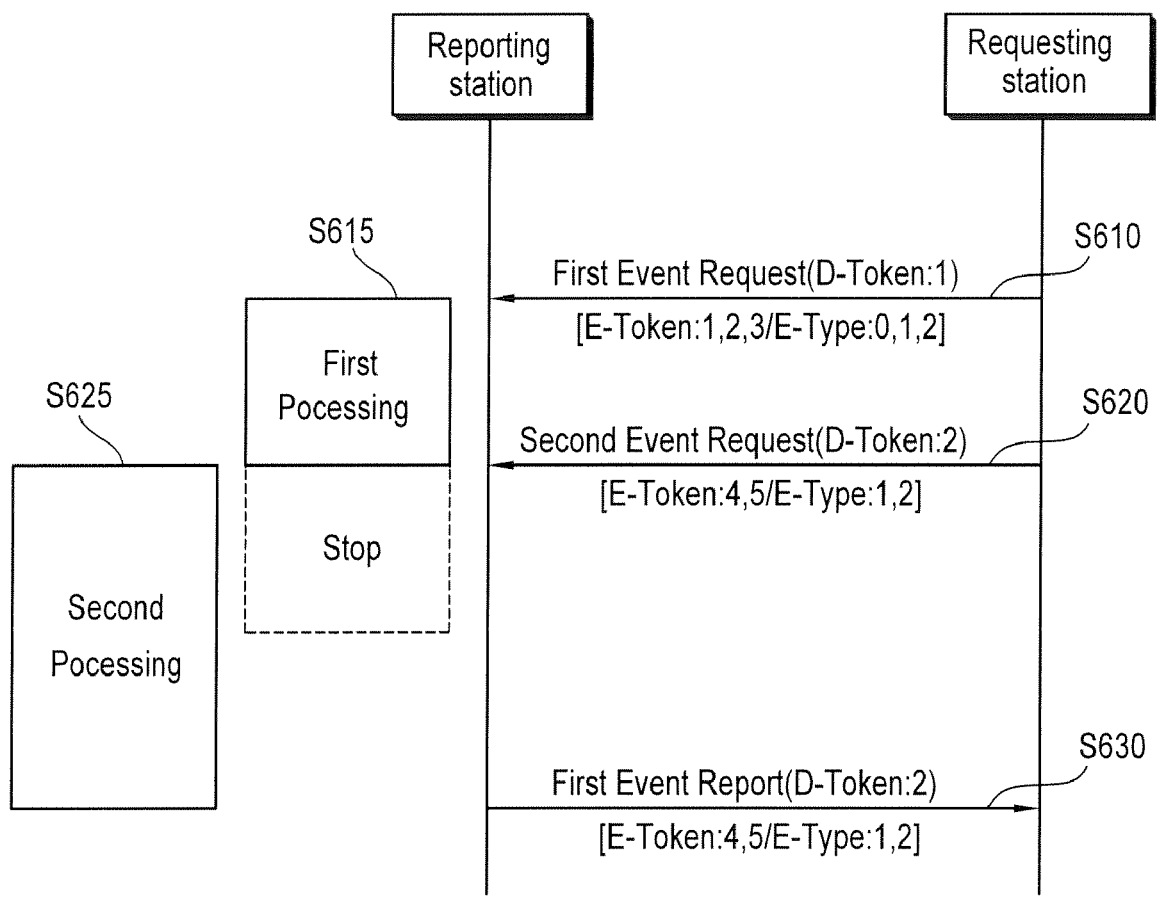
FIG. 14 is a flow diagram illustrating a wireless network management procedure according to another embodiment of the invention.

FIG. 14 is a flow diagram illustrating a wireless network management procedure according to another embodiment of the invention. In this embodiment, event request frames having different dialog tokens and different event tokens are continuously received from the same requesting STA.

Referring to FIG. 14, a requesting STA transmits a first event request frame (S610). It is assumed that the first event request frame includes dialog tokens (D-token) of "1", event tokens of "1, 2, 3", and event types of "0, 1, 2." That is, the first event request frame includes three event request elements of which the event types are the transition event, the RSNA event, and the peer-to-peer link event. A reporting STA having received the first event request frame starts processing the first event request frame (first process) (S615). The reporting STA processes information on the transition event, the RSNA event, and the peer-to-peer link event by the event types to generate an event report frame.

The reporting STA receives a second event request frame from the same requesting STA in the course of processing the first event request frame (S620). It is assumed that the second event request frame includes a dialog token of "2", event tokens of "4, 5", and event types of "1, 2." That is, the second event request frame includes two event request elements of which the event types are the RSNA event and the peer-to-peer event. The reporting STA compares the dialog token included in the first event request frame with the dialog token included in the second event request frame. When the dialog token of the first event request frame is different from the dialog token of the second event request frame, the reporting STA stops processing the first event request frame.

The reporting STA starts processing the second even request frame (second process) (S625). The reporting STA processes the latest information on the RSNA event and the peer-to-peer link event corresponding to the event types of the second event request frame to generate a second event report frame. When the process of the second event request frame is completed, the reporting STA transmits the second event report frame to the requesting STA I response to the second event request frame (S630). The second event report frame may include a dialog token of "2", event tokens of "4, 5", and event types of "1, 2."

Therefore, according to this embodiment, when a STA receives subsequent event request frames with the same dialog token and different event token from the same requesting STA before the event report to the previous request has been completed, the STA shall respond only to the latest request.

Figure 15:
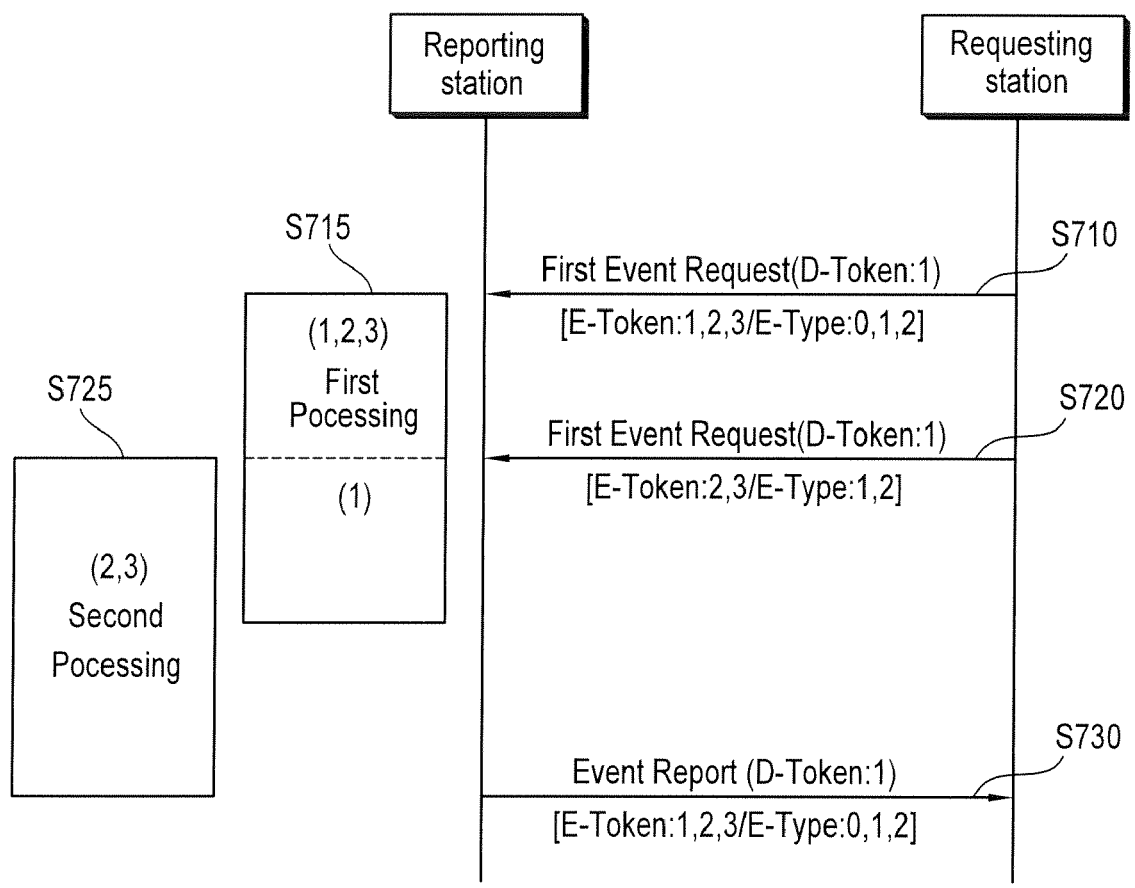
FIG. 15 is a flow diagram illustrating a wireless network management procedure according to another embodiment of the invention.

FIG. 15 is a flow diagram illustrating a wireless network management procedure according to another embodiment of the invention. In this embodiment, event request frames having the same dialog tokens and overlapping event tokens are continuously received from the same requesting STA.

Referring to FIG. 15, a requesting STA transmits a first event request frame (S710). It is assumed that the first event request frame includes dialog tokens (D-token) of "1", event tokens of "1, 2, 3", and event types of "0, 1, 2." That is, the first event request frame includes three event request elements of which the event types are the transition event, the RSNA event, and the peer-to-peer link event. A reporting STA having received the first event request frame starts processing the first event request frame (first process) (S715). The reporting STA processes information on the transition event, the RSNA event, and the peer-to-peer link event by the event types to generate an event report frame.

The reporting STA receives a second event request frame from the same requesting STA in the course of processing the first event request frame (S720). It is assumed that the second event request frame includes a dialog token of "1", event tokens of "2, 3", and event types of "1, 2." That is, the second event request frame includes the event tokens overlapping with those of the first event request frame and includes two request elements of which the event types are the RSNA event and the peer-to-peer event. The reporting STA compares the dialog token included in the first event request frame with the dialog token included in the second event request frame. When the dialog token of the first event request frame is equal to the dialog token of the second event request frame, the reporting STA compares the event tokens of the first event request frame and the event tokens of the second event request frame. The event request element corresponding to the overlapping event token among the event tokens of the first event request frame and the event tokens of the second event request frame is stopped in processing the first event request frame and is processed along with the second event request frame. That is, the RSNA event and the peer-to-peer link event which are the event types corresponding to the overlapping event tokens "2, 3" are stopped in processing the first event request frame, and only the transition event which is the event type corresponding to the non-overlapping event token "1" is not stopped in processing the first event request frame.

The reporting STA starts processing the second event request frame (second process) (S725). The reporting STA processes the latest information on the RSNA event and the peer-to-peer link event corresponding to the event types of the second event request frame. When the processes of the first event request frame and the second event request frame are completed, the reporting STA transmits to the requesting STA an event report frame including the event types corresponding to the event tokens included in the first event request frame or the second event request frame (S730) The event report frame includes a dialog token "1", event tokens "1, 2, 3", and event types of "0, 1, 2."

Figure 16:
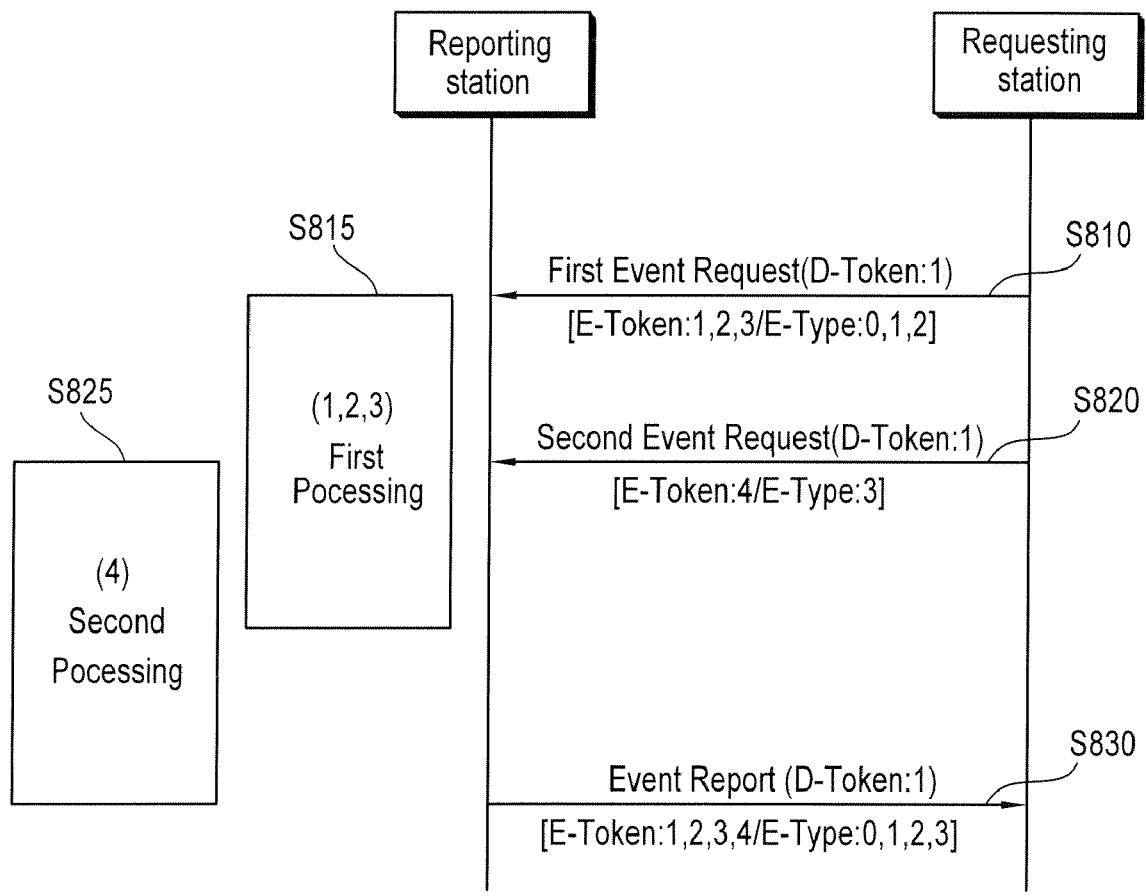
FIG. 16 is a flow diagram illustrating a wireless network management procedure according to another embodiment of the invention.

FIG. 16 is a flow diagram illustrating a wireless network management procedure according to another embodiment of the invention. In this embodiment, event request frames including the same dialog token and different event tokens are continuously received from the same requesting STA.

Referring to FIG. 16, a requesting STA transmits a first event request frame (S810). It is assumed that the first event request frame includes dialog tokens (D-token) of "1", event tokens of "1, 2, 3", and event types of "0, 1, 2." That is, the first event request frame includes three event request elements of which the event types are the transition event, the RSNA event, and the peer-to-peer link event. A reporting STA having received the first event request frame starts processing the first event request frame (first process) (S815). The reporting STA processes information on the transition event, the RSNA event, and the peer-to-peer link event by the event types to generate an event report frame.

The reporting STA receives a second event request frame from the same requesting STA in the course of processing the first event request frame (S820). It is assumed that the second event request frame includes a dialog token of "1", an event token of "4", and an event type of "3." That is, the second event request frame includes an event token different from that of the first event request frame and one event request element of which the event type is a system log event. The reporting STA compares the dialog token included in the first event request frame with the dialog token included in the second event request frame. When the dialog token of the first event request frame is equal to the dialog token of the second event request frame, the reporting STA compares the event token included in the first event request frame with the event token included in the second event request frame. Since the event token of the first event request frame does not overlap with the event token of the second event request frame, the reporting STA processes both the first event request frame and the second event request frame.

The reporting STA starts processing the second event request frame (second process) (S825). The reporting STA processes the latest information on the system log event corresponding to the event type of the second event request frame. When the processes of the first event request frame and the second event request frame are completed, the reporting STA transmits to the requesting STA a second event report frame including all the event types corresponding to the event tokens of the first event request frame and the second event request frame (S830). The second event report frame includes a dialog token of "1", event tokens of "1, 2, 3", and event types of "0, 1, 2, 3."

Therefore, according to this embodiment, when a STA receives event request frames with the same dialog tokens from the same requesting STA, the STA shall respond to all the requests.

According to the above-mentioned embodiments of the invention, since it is possible to determined whether the event request frames should be processed depending on the sameness of the requesting STAs transmitting the event request frames and the dialog tokens, the event tokens, and the event requests included in the event request frames, it is possible to properly cope with a variety of network statuses, thereby smoothly managing a wireless network.

Figure 17:
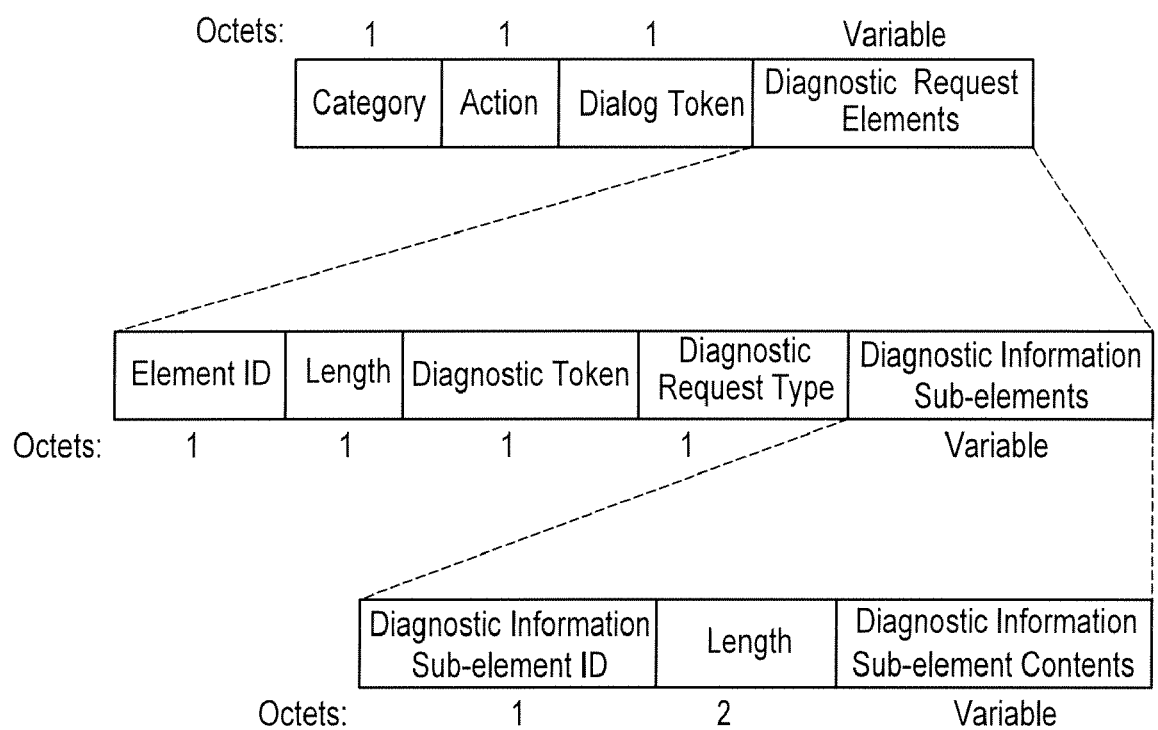
FIG. 17 is a diagram illustrating a structure of a diagnostic request frame in a wireless network according to another embodiment of the invention.

FIG. 17 is a diagram illustrating a structure of a diagnostic request frame in a wireless network according to another embodiment of the invention. The diagnostic request frame is transmitted from a non-AP STA or an AP intending to manage the wireless network or requiring a variety of information on the STAs, and serves to request a STA having received the diagnostic request frame for performing a diagnostic test or transmitting a variety of information.

Referring to FIG. 17, the diagnostic request frame includes a category field, an action field, a dialog token field, and a diagnostic request element field. The category field is set to a value indicating a wireless network management category and has a size of 1 octet. The action field is set to a value indicating that the frame is a diagnostic request frame, and has a size of 1 octet. The dialog token field is set to a value selected by the STA transmitting the diagnostic request frame to identify the exchange of the event request frame and the event report frame and has a size of 1 octet. The diagnostic request element field includes a request of requesting the STA having received the diagnostic request frame for doing a specific diagnostic action. The size of the diagnostic request element field is limited within the size of the maximum allowable MMPDU, and the number thereof is limited within the size but may be two or more.

Referring to FIG. 17, the diagnostic request element field includes an element ID subfield, a length subfield, a diagnostic token subfield, a diagnostic request type subfield, and a diagnostic information sub-element subfield. The element ID subfield is set to a value indicating a diagnostic request among various information elements. The length subfield is set to various values depending on the length of the diagnostic information sub-element subfield. The diagnostic token subfield is set to a unique value of the diagnostic request elements not receiving the corresponding diagnostic report elements among the diagnostic request elements having been transmitted to destination MAC addresses. The diagnostic request type subfield is set to a value for identifying the type of the diagnostic request.

The diagnostic information sub-element subfield includes 0 or more diagnostic information sub-elements depending on the specified diagnostic request type. When the diagnostic request type is a manufacturer information STA report, an operating parameter STA report, a capability STA report, or a configuration profile, the diagnostic request element field may not include the diagnostic information sub-element subfield. However, in this case, the diagnostic report frame may include information on diagnostic information sub-element contents in accordance with a predetermined standard.

Referring to FIG. 17, the diagnostic information sub-element subfield includes a diagnostic information sub-element ID unit, a length unit, and a diagnostic information sub-element contents unit. The diagnostic information sub-element ID unit is set to a value indicating the type of a diagnostic information sub-element. The type of the diagnostic information sub-element includes an antenna type, an antenna gain, a result code, and a data rate. The length unit is set to a value indicating the length of the diagnostic information sub-element contents unit. The diagnostic information sub-element contents unit includes diagnostic information sub-element contents.

The result code of the diagnostic information sub-element type can be used to give a different instruction for the transmitted diagnostic request frame. For example, when a diagnostic request frame was transmitted previously but a diagnostic report frame is not received from the reporting STA and it is intended to cancel the request, the diagnostic request frame in which information indicating "cancel" is set in the result code can be transmitted again. Values assigned to the result code are shown in Table 6.

TABLE 6

| Value | Description |
| --- | --- |
| 0 | Unspecified |
| 1 | Timeout waiting for response from STA |
| 2 | Cancelled |
| 3-255 | Reserved |

Figure 18:
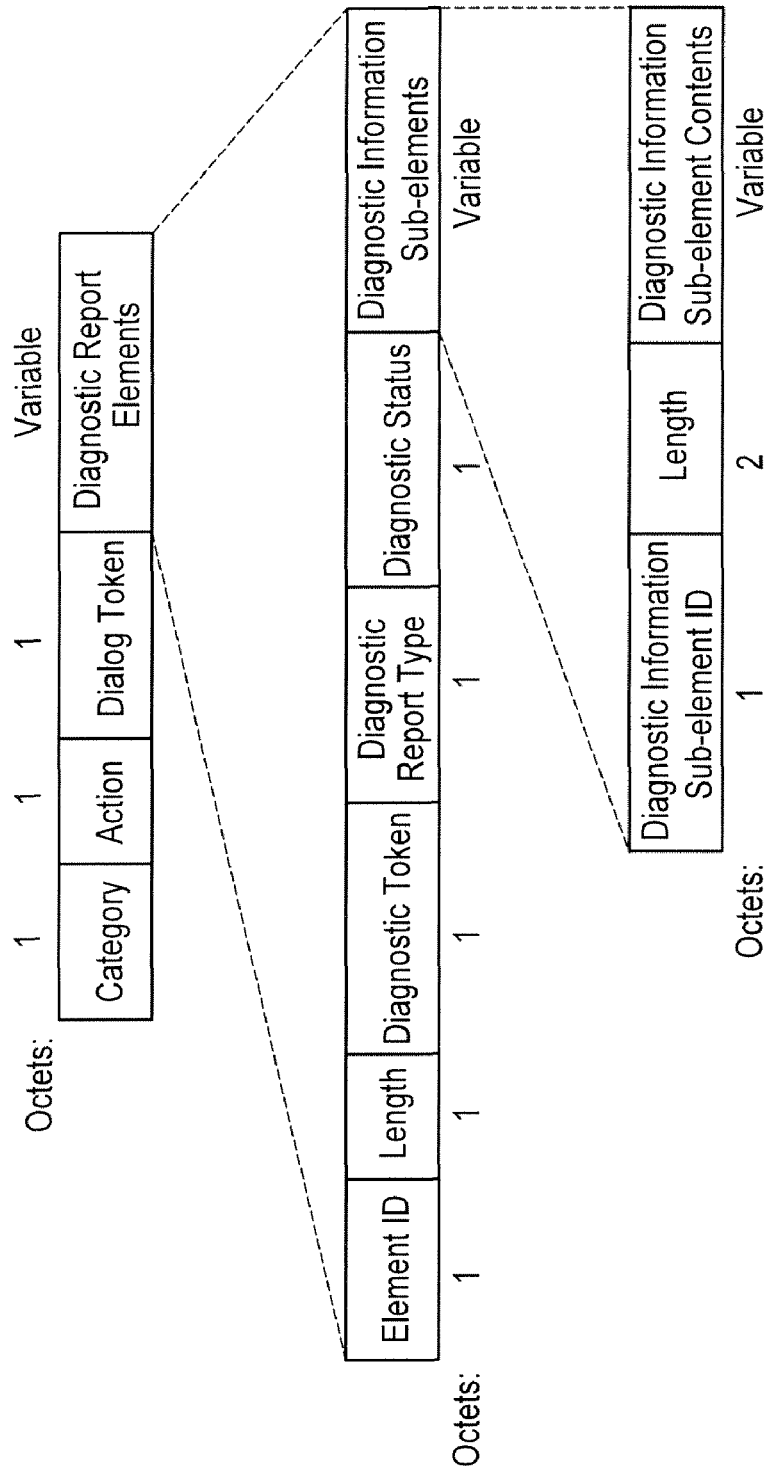
FIG. 18 is a diagram illustrating a structure of a diagnostic report frame in a wireless network according to another embodiment of the invention.

FIG. 18 is a diagram illustrating a structure of a diagnostic report frame in a wireless network according to another embodiment of the invention. The diagnostic report frame is transmitted by a STA in response to the diagnostic request frame.

Referring to FIG. 18, the diagnostic report frame includes a category field, an action field, a dialog token field, and a diagnostic report element field. The category field is set to a value indicating a wireless network management category and has a size of 1 octet. The action field is set to a value indicating that the frame is a diagnostic report frame and has a size of 1 octet. The dialog token field is set to a value corresponding to the received diagnostic request frame and has a size of 1 octet. The diagnostic report element field includes one or more diagnostic report elements. The size and number of diagnostic request elements in the diagnostic report frame are limited within the size of the allowable MMPDU.

Referring to FIG. 18, the diagnostic report element field includes an element ID subfield, a length subfield, a diagnostic token subfield, a diagnostic report type subfield, a diagnostic status subfield, and a diagnostic information sub-element subfield. The element ID subfield is set to a value indicating a diagnostic report element among values indicating various information elements. The length subfield is set to various values depending on the length of the diagnostic information sub-element subfield. The diagnostic token subfield is set to a diagnostic token of a diagnostic request element in the received diagnostic request frame. The diagnostic report type subfield is set to a value for identifying the type of the diagnostic report.

The diagnostic status subfield is set to a value indicating the entire results for the diagnostic request, that is, a value included in the result code. For example, when a reporting STA can complete the diagnostic request included in the diagnostic request element of the received diagnostic request frame, the diagnostic status subfield is set to a value indicating "successful." When the reporting STA cannot process the received request, the diagnostic status subfield is set to a value indicating "failure." When the STA having received the diagnostic request frame does not support the diagnostic service, the diagnostic status subfield is set to a value indicating "incapable." The diagnostic information sub-element subfield includes the diagnostic results of the received diagnostic request frame and sequentially includes one or more information sub-elements for each diagnostic report type. The result codes used for the diagnostic status subfield are shown in Table 7.

TABLE 7

| Result Code | Description |
| --- | --- |
| 0 | Successful |
| 1 | Fail |
| 2 | Refused |
| 3 | Incapable |
| 4-255 | Reserved |

Referring to FIG. 18, the diagnostic information sub-element subfield includes a diagnostic information sub-element ID unit, a length unit, and a diagnostic information sub-element contents unit. The diagnostic information sub-element ID unit is set to a value indicating the type of a diagnostic information sub-element. The length unit is set to a value indicating the length of the diagnostic information sub-element contents unit. The diagnostic information sub-element contents unit includes diagnostic information sub-element contents.

Figure 19:
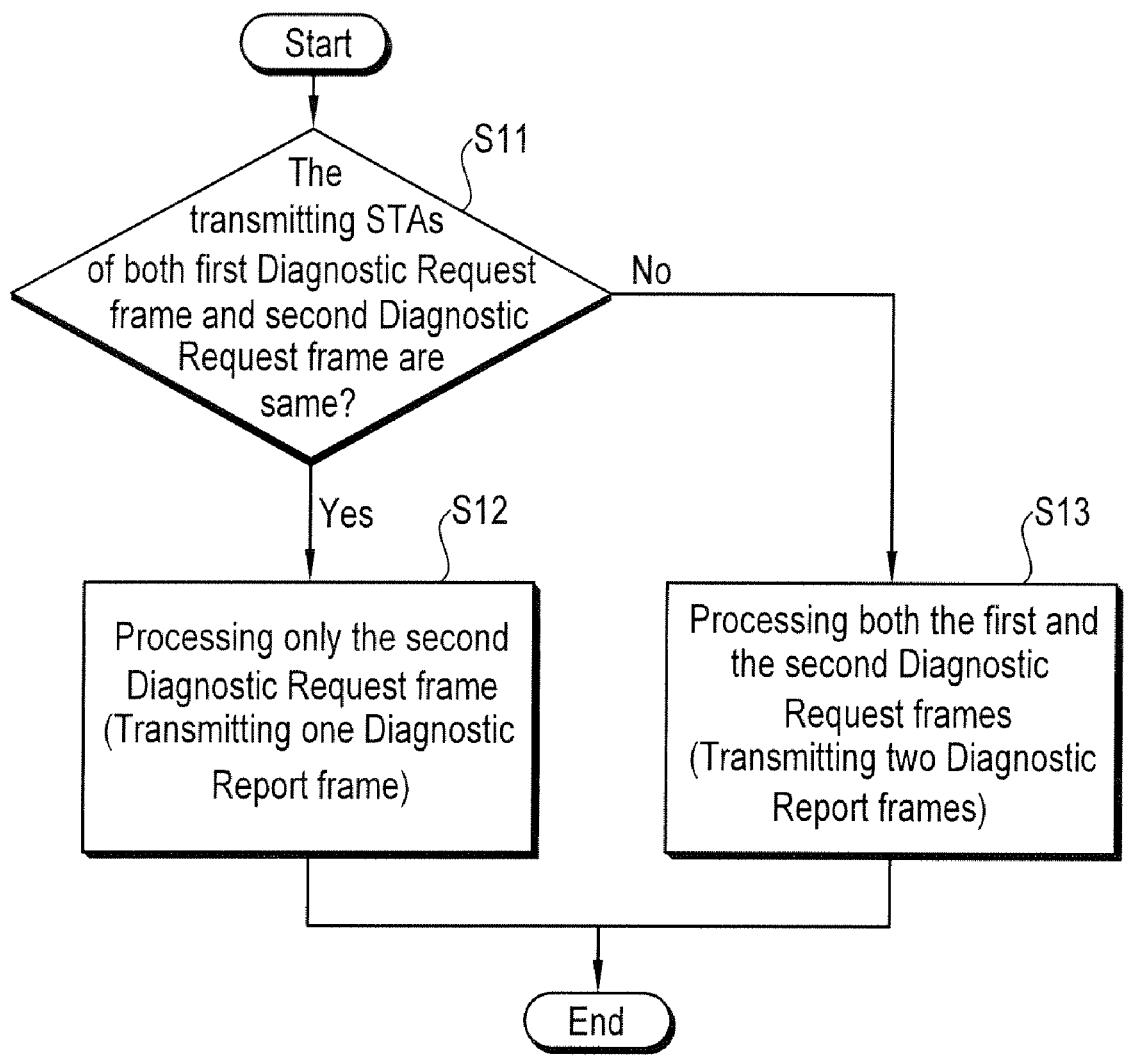
FIG. 19 is a flow diagram illustrating a processing procedure diagnostic request frames continuously received.

FIG. 19 is a flow diagram illustrating a processing procedure diagnostic request frames continuously received. Here, the "continuous diagnostic request frames" include a "first diagnostic request frame" received previously and a "second diagnostic request frame" received before the diagnostic report for the first diagnostic request frame is completed. The number of continuous diagnostic request frames is not limited two, but may be two or more. The diagnostic request frames may have the format shown in FIG. 17.

Referring to FIG. 19, a STA having received the continuous diagnostic request frames determines whether a STA transmitting the first diagnostic request frame is equal to a STA transmitting the second diagnostic request frame (S100). In this embodiment, it is determined whether the transmitting STAs are equal to each other, but it may be determined in some embodiments whether source STAs are equal to each other instead of the transmitting STAs. When it is determined that the transmitting STAs are equal to each other, the process of step S1200 is performed. When it is not determined that the transmitting STAs are equal to each other, the process of step S1300 is performed.

When the STAs transmitting the continuous diagnostic request frames are equal to each other, that is, in step S1200, the receiving STA processes only the frame received the latest, for example, the second diagnostic request frame. In this case, when the receiving STA is processing the first diagnostic request frame, the receiving STA stops the processing. As a result, the receiving STA generates a diagnostic report frame in response to the second diagnostic request frame and transmits the generated diagnostic report frame to the transmitting STA. In this case, by allowing the diagnostic report frame to include the same dialog token as the dialog token included in the second diagnostic request frame, it can be indicated that the diagnostic report frame is a response to the second diagnostic request frame. The diagnostic report frame may have the format shown in FIG. 18.

On the contrary, when it is determined that the transmitting STAs transmitting the continuous diagnostic request frames are different from each other, that is, in step S1300, the receiving STA processes all the received frames, for example, the first and second diagnostic request frames. In this case, the receiving STA can sequentially process the continuous diagnostic request frames, or may first process a diagnostic request frame having priority in some cases. As a result, the receiving STA generates first and second diagnostic report frames for the first and second diagnostic request frames and transmits the generated diagnostic report frames to the transmitting STA.

In this case, by allowing the first diagnostic report frame to include the same dialog token as the dialog token included in the first diagnostic request frame and allowing the second diagnostic report frame to include the same dialog token as the dialog token included in the second diagnostic request frame, it can be indicated that the diagnostic report frames are responses to the diagnostic request frames, respectively. Of course, as described above, when there are much data to be transmitted in response to one diagnostic request frame, plural diagnostic report frames having the same dialog token may be transmitted.

According to the embodiment of the invention, when continuous diagnostic request frames are received, it is possible to adaptively process the continuous diagnostic request frames by performing different procedures depending on it whether the transmitting STAs transmitting the diagnostic request frames are equal to or different from each other. Even when a STA with wrong intention repeatedly transmits continuous diagnostic request frames, it is possible to process the diagnostic requests from different STAs. When diagnostic request frames are continuously received from the same STA, it is possible to perform a process corresponding to the intention of the requesting STA by processing only the latest diagnostic request frame.

On the other hand, according to the embodiment of the invention, two result codes are used. One is shown in Table 6 and contains information on the forcible stop of processing the previously transmitted diagnostic request frame or the elapse of a setup timeout period. The other is shown in Table 7, and contains information on the process results of the received diagnostic request frame, such as successful, failure, and incapable. The use of the same result code in different usages, that is, the use of two similar code formats in one procedure, can cause a configuration in processing messages. Since the result codes do not represent concrete reasons for the information, the result codes are not reliable as network management information.

One solution to the above-mentioned problems is to merge two result codes into one result code. FIG. 20 is a diagram illustrating a result code prepared according to an embodiment of the invention. Referring to FIG. 20, all the information shown in Tables 6 and 7 is included in one result code in this embodiment. Accordingly, by using the result code according to this embodiment, it is possible to use the same result code for the diagnostic request frame and the diagnostic report frame.

Another solution is to merge two result codes into one result code and to set up different result codes depending on the reason for the respective cases. FIG. 21 is a diagram illustrating another result code prepared according to another embodiment of the invention. Referring to FIG. 21, in this embodiment of the invention, it can be seen that all the information shown in Tables 6 and 7 is included in one result code and different result codes are assigned to the information depending on the reason thereof.

According to this embodiment, when continuous diagnostic request frames are received, it is possible to adaptively process the continuous diagnostic request frames by using different processing procedures depending on it whether the transmitting STAs transmitting the diagnostic request frames are equal to or different from each other. Even when a STA with wrong intention repeatedly transmits continuous diagnostic request frames, it is possible to process the diagnostic requests from different STAs. When diagnostic request frames are continuously received from the same STA, it is possible to perform a process corresponding to the intention of the requesting STA by processing only the latest diagnostic request frame.

The embodiments described above in detail are only examples explaining the technical spirit of the invention and it should be understood that the technical spirit is not limited to the embodiments. The scope of the invention is defined by the appended claims.

According to an embodiment of the present invention, even when a reporting STA does not have any detail to be reported for a requested event request element, it is possible to omit unnecessary wait time and to enhance efficiency of wireless network management, by providing a method of notifying a requesting STA of such information. In addition, by clearly defining a processing procedure when a STA departs from an originally accessed ESS or departs from an IBSS, it is possible to clearly define the wireless network management procedure. According to the technical solutions, by clearly defining a link connection time included in a peer-to-peer link event, it is possible to manage a wireless network on the basis of accurate information.

The embodiments described above in detail are only examples explaining the technical spirit of the invention and it should be understood that the technical spirit is not limited to the embodiments. The scope of the invention is defined by the appended claims.

What is claimed is:

1. A method for real-time diagnostics in a wireless local area network, the method comprising:
logging, by a reporting station, events to generate event log entries;
determining, by the reporting station, whether the reporting station moves to a different extended service set (ESS) or independent basic service set (IBSS);
if it is determined that the reporting station moves to the different ESS or IBSS, deleting, by the reporting station, all the event log entries;
receiving, by the reporting station, an event request from a requesting station, the event request including a dialog token, an event type and zero or more event request element, the dialog token identifying the requesting station, the event type indicating a type of an event to be reported, an event request element including at least one condition that establishes event reporting when the reporting station experiences problems or failures; and
transmitting, by the reporting station, an event report to the requesting station in response to the event request, the event report including a status, the dialog token, the event type and the zero or more event report element, the status indicating a result of the event request and the event report, an event report element including at least one event log entry corresponding to the event type,
wherein if there are no available event log entries for the event type specified in the event request, the status indicates success of the event request, and the event report is transmitted without the event report element, and
wherein if the event request does not include any event request element, the status indicates the success of the event request, and the event report includes all event log entries available for the event request.

2. The method of claim 1, further comprising:
if all the event report elements do not fit into the event report, transmitting remaining event report elements in an additional event report to the requesting station.

3. The method of claim 1, wherein receiving the event request from the requesting station comprises:
receiving, by the reporting station, a plurality of event requests from a plurality of requesting stations, each event request including a dialog token, an event type and zero or more event request element,
wherein the event report is transmitted in response to a most recent event request among the plurality of event requests.

4. The method of claim 1, wherein the event type indicates one of a transition event, a Robust Security Network Association (RSNA) event and a peer-to-peer link event.

5. A wireless device for real-time diagnostics in a wireless local area network, the wireless device comprising a processor configured to:
log events to generate event log entries;
determine whether the wireless device moves to a different extended service set (ESS) or independent basic service set (IBSS);
if it is determined that the wireless device moves to the different ESS or IBSS, delete all the event log entries;
receive an event request from a requesting station, the event request including a dialog token, an event type and zero or more event request element, the dialog token identifying the requesting station, the event type indicating a type of an event to be reported, an event request element including at least one condition that establishes event reporting when the wireless device experiences problems or failures; and transmit an event report to the requesting station in response to the event request, the event report including a status, the dialog token, the event type and zero or more event report element, the status indicating a result of the even request and the event report, an event report element including at least one event log entry corresponding to the event type, wherein if there are no available event log entries for the event type specified in the event request, the status indicates success of the event request, and the event report is transmitted without the event report element, and wherein if the event request does not include any event request element, the status indicates the success of the event request, and the event report includes all event log entries available for the event request.

6. The wireless device of claim 5, wherein the processor is further configured to transmit remaining event report elements in an additional event report to the request station if all the event report elements do not fit into the event report.

7. The wireless device of claim 5, wherein the processor is further configured to receive the event request from the requesting station by receiving a plurality of event requests from a plurality of requesting stations, each event request including a dialog token, an event type and zero or more event request element, wherein the event report is transmitted in response to a most recent event request among the plurality of event requests.

8. The wireless device of claim 5, wherein the event type indicates one of a transition event, a Robust Security Network Association (RSNA) event and a peer-to-peer link event.

* * * * *